US012158761B2

United States Patent
Leeman

(10) Patent No.: US 12,158,761 B2
(45) Date of Patent: Dec. 3, 2024

(54) LOCATION BASED PARAMETERS FOR AN IMAGE SENSOR

(71) Applicant: Motional AD LLC, Boston, MA (US)

(72) Inventor: Peter Leeman, Pittsburgh, PA (US)

(73) Assignee: Motional AD LLC, Boston, MA (US)

(*) Notice: Subject to any disclaimer, the term of this patent is extended or adjusted under 35 U.S.C. 154(b) by 249 days.

(21) Appl. No.: 17/446,929

(22) Filed: Sep. 3, 2021

(65) Prior Publication Data

US 2023/0075701 A1    Mar. 9, 2023

(51) Int. Cl.

| | |
|---|---|
| *G05D 1/02* | (2020.01) |
| *G01C 21/34* | (2006.01) |
| *G01S 13/931* | (2020.01) |
| *G01S 17/931* | (2020.01) |
| *G05D 1/00* | (2006.01) |
| *G06K 9/00* | (2022.01) |
| *G06V 20/56* | (2022.01) |

(52) U.S. Cl.
CPC ........... *G05D 1/0246* (2013.01); *G01C 21/34* (2013.01); *G01S 13/931* (2013.01); *G01S 17/931* (2020.01); *G06V 20/56* (2022.01)

(58) Field of Classification Search
CPC .... G05D 1/0246; G01C 21/34; G01S 13/931; G01S 17/931; G06V 20/56; G06V 10/10; H04N 23/72; H04N 23/70; H04N 23/62; H04N 23/54; H04N 23/57; H04N 23/74; H04N 23/76
See application file for complete search history.

(56) References Cited

U.S. PATENT DOCUMENTS

| | | | | |
|---|---|---|---|---|
| 9,836,484 | B1* | 12/2017 | Bialynicka-Birula | ....................... G06V 40/172 |
| 11,637,998 | B1* | 4/2023 | Pieper | .................... H04N 23/85 348/207.99 |
| 2008/0218613 | A1* | 9/2008 | Janson | .................... H04N 23/70 348/262 |
| 2020/0019160 | A1* | 1/2020 | McArthur | ............... G01S 17/87 |
| 2020/0086791 | A1* | 3/2020 | Hardy | ........................ G06T 5/50 |
| 2020/0106965 | A1* | 4/2020 | Malia | ..................... H04N 23/62 |
| 2022/0215201 | A1* | 7/2022 | Dwivedi | ................. G06N 3/045 |

OTHER PUBLICATIONS

Burnett, K. et al., "Zeus: A System Description of the Two-Time Winner of the Collegiate SAE AutoDrive Competition", pre-print Apr. 2020, in 41 pages. URL: https://www.researchgate.net/publication/340805709_Zeus_A_System_Description_of_the_Two-Time_Winner_of_the_Collegiate_SAE_AutoDrive_Competition.

(Continued)

*Primary Examiner* — Peter D Nolan
*Assistant Examiner* — Demetra R Smith-Stewart
(74) *Attorney, Agent, or Firm* — Knobbe, Martens, Olson & Bear, LLP

(57) ABSTRACT

Provided are methods for location based parameters for an image sensor, which can include determining the geographic location of the vehicle, adjusting the parameters of the image sensor of the vehicle from a first setting to a second setting based on the geographic location of the vehicle, receiving sensor data associated with the image sensor based on the second setting, and processing the sensor data to generate an image. Systems and computer program products are also provided.

19 Claims, 9 Drawing Sheets

(56) References Cited

OTHER PUBLICATIONS

SAE On-Road Automated Vehicle Standards Committee, "SAE International's Standard J3016: Taxonomy and Definitions for Terms Related to Driving Automation Systems for On-Road Motor Vehicles", Jun. 2018, in 35 pages.

Wang, Z. et al., "Multi-Sensor Fusion in Automated Driving: A Survey", IEEE Access, Dec. 2019, vol. 8, pp. 2847-2868.

Great Britain Office Action issued for Application No. GB 2114162.7, dated Jun. 24, 2022.

Dickmanns, E. D., *Dynamic Vision for Perception and Control of Motion*, Springer-Verlag London Limited, 2007, ISBN: 978-1-84628-637-7, in 490 pages.

Hoefflinger, B. H., *High-Dynamic-Range (HDR) Vision: Microelectronics, Image Processing, Computer Graphics—Springer Series in Advanced Microelectronics 26*, Springer Berlin Heidelberg, 2007, ISBN: 103540444327, in 248 pages.

Kisacanin, B. et al., *Advances in Embedded Computer Vision*, Springer International Publishing AG Switzerland, 2014, ISBN: 9783319093864, in 293 pages.

Lopez, A. M. et al., *Computer Vision in Vehicle Technology: Land, Sea, and Air*, John Wiley & Sons Ltd., 2017, ISBN: 9781118868072, in 217 pages.

Marek, J. et al., "*Sensors for Automotive Applications*", Wiley-VCH, 2003, ISBN: 3527295534, in 577 pages.

Rezaei, M. et al., *Computer Vision for Driver Assistance—Simultaneous Traffic and Driver Monitoring*, Springer International Publishing AG, 2017, ISBN: 9783319505497, in 236 pages.

Terzis, A., *Handbook of Camera Monitor Systems—The Automotive Mirror-Replacement Technology based on ISO 16505*, Springer International Publishing Switzerland, 2016, ISBN: 9783319296098, in 539 pages (reference document uploaded in two parts).

Vlacic, L. et al., *Intelligent Vehicle Technologies: Theory and Applications*, Butterworth-Heinemann, 2001, ISBN: 0750650931, in 519 pages.

Wallentowitz, H. et al., *Handbuch Kraftfahrzeugelektronik*, Vieweg + Teubner Verlag Wiesbaden, 2006, in 749 pages (reference document uploaded in two parts).

Winner, H. et al., *Handbuch Fahrerassistenzsysteme*, Springer Vieweg Wiesbaden, 2015, ISBN: 9783658057336, in 1225 pages (reference document uploaded in four parts).

Wordenweber, B. et al., *Automotive Lighting and Human Vision*, Springer Berlin Heidelberg New York, 2007, ISBN: 9783540366966, in 414 pages.

\* cited by examiner

LOCATION BASED PARAMETERS FOR AN IMAGE SENSOR

BACKGROUND

Self-driving vehicles typically use multiple types of images to perceive the area around them. Adjusting the settings of these systems to generate accurate and precise images of an area can be difficult and complicated.

DETAILED DESCRIPTION

Figure 1:
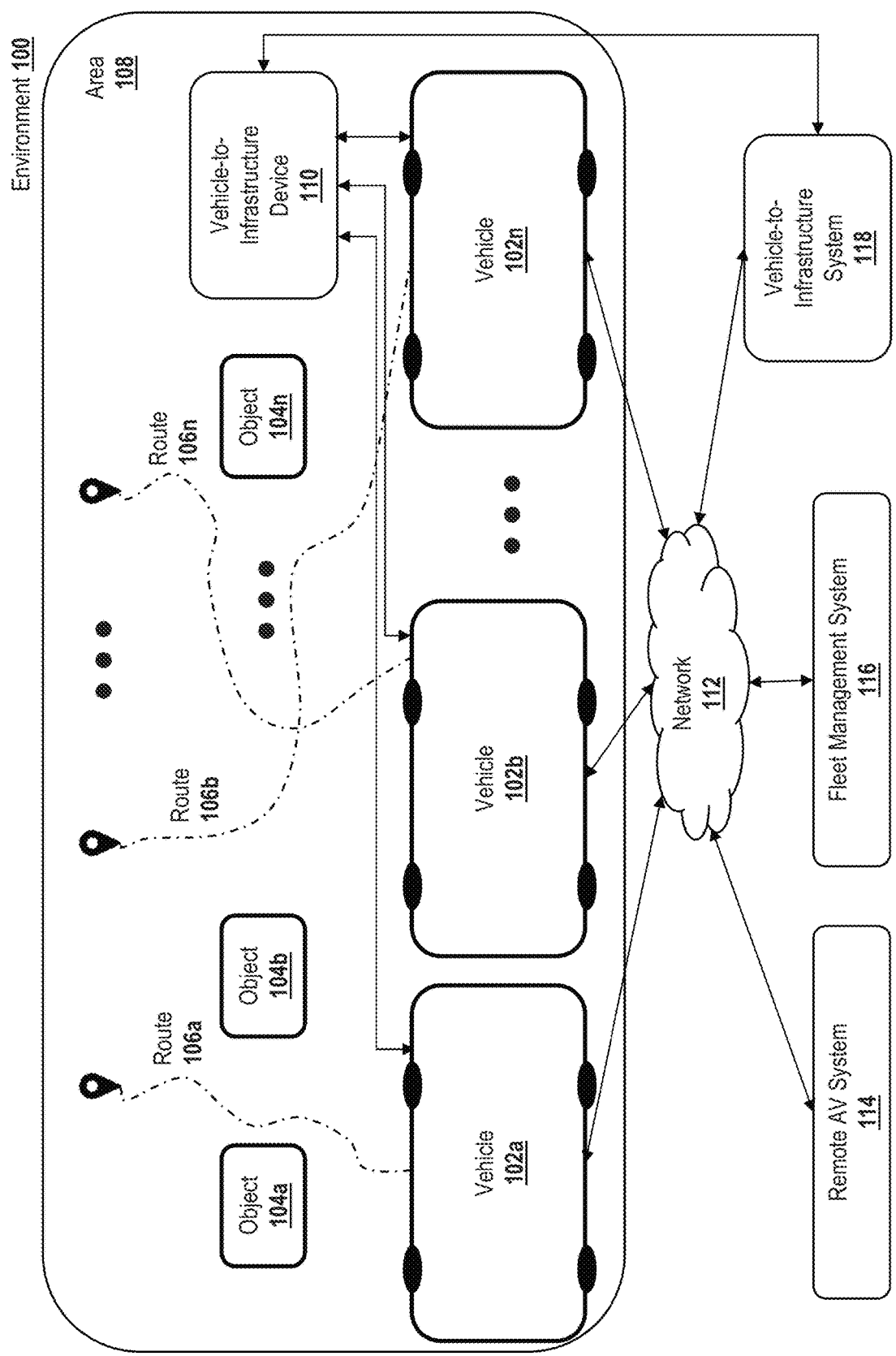
FIG. 1 is an example environment in which a vehicle including one or more components of an autonomous system can be implemented.

In the following description numerous specific details are set forth in order to provide a thorough understanding of the present disclosure for the purposes of explanation. It will be apparent, however, that the embodiments described by the present disclosure can be practiced without these specific details. In some instances, well-known structures and devices are illustrated in block diagram form in order to avoid unnecessarily obscuring aspects of the present disclosure.

Specific arrangements or orderings of schematic elements, such as those representing systems, devices, modules, instruction blocks, data elements, and/or the like are illustrated in the drawings for ease of description. However, it will be understood by those skilled in the art that the specific ordering or arrangement of the schematic elements in the drawings is not meant to imply that a particular order or sequence of processing, or separation of processes, is required unless explicitly described as such. Further, the inclusion of a schematic element in a drawing is not meant to imply that such element is required in all embodiments or that the features represented by such element may not be included in or combined with other elements in some embodiments unless explicitly described as such.

Further, where connecting elements such as solid or dashed lines or arrows are used in the drawings to illustrate a connection, relationship, or association between or among two or more other schematic elements, the absence of any such connecting elements is not meant to imply that no connection, relationship, or association can exist. In other words, some connections, relationships, or associations between elements are not illustrated in the drawings so as not to obscure the disclosure. In addition, for ease of illustration, a single connecting element can be used to represent multiple connections, relationships or associations between elements. For example, where a connecting element represents communication of signals, data, or instructions (e.g., "software instructions"), it should be understood by those skilled in the art that such element can represent one or multiple signal paths (e.g., a bus), as may be needed, to affect the communication.

Although the terms first, second, third, and/or the like are used to describe various elements, these elements should not be limited by these terms. The terms first, second, third, and/or the like are used only to distinguish one element from another. For example, a first contact could be termed a second contact and, similarly, a second contact could be termed a first contact without departing from the scope of the described embodiments. The first contact and the second contact are both contacts, but they are not the same contact.

The terminology used in the description of the various described embodiments herein is included for the purpose of describing particular embodiments only and is not intended to be limiting. As used in the description of the various described embodiments and the appended claims, the singular forms "a," "an" and "the" are intended to include the plural forms as well and can be used interchangeably with "one or more" or "at least one," unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description specify the presence of stated features, integers, steps, operations, elements, and/or components, but do not preclude the presence or addition of one or more other features, integers, steps, operations, elements, components, and/or groups thereof.

As used herein, the terms "communication" and "communicate" refer to at least one of the reception, receipt, transmission, transfer, provision, and/or the like of information (or information represented by, for example, data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some embodiments, a message may refer to a network packet (e.g., a data packet and/or the like) that includes data.

As used herein, the term "if" is, optionally, construed to mean "when", "upon", "in response to determining," "in response to detecting," and/or the like, depending on the context. Similarly, the phrase "if it is determined" or "if [a stated condition or event] is detected" is, optionally, construed to mean "upon determining," "in response to determining," "upon detecting [the stated condition or event]," "in response to detecting [the stated condition or event]," and/or the like, depending on the context. Also, as used herein, the terms "has", "have", "having", or the like are intended to be open-ended terms. Further, the phrase "based on" is intended to mean "based at least partially on" unless explicitly stated otherwise.

Reference will now be made in detail to embodiments, examples of which are illustrated in the accompanying drawings. In the following detailed description, numerous specific details are set forth in order to provide a thorough understanding of the various described embodiments.

However, it will be apparent to one of ordinary skill in the art that the various described embodiments can be practiced without these specific details. In other instances, well-known methods, procedures, components, circuits, and networks have not been described in detail so as not to unnecessarily obscure aspects of the embodiments.

General Overview

In some aspects and/or embodiments, systems, methods, and computer program products described herein include and/or implement a signal processing system that adjusts parameters of image sensors based on a determined geographic location of a vehicle. The signal processing system can proactively adjust the parameters of the image sensors in order to improve the accuracy of the sensor data obtained and processed by the signal processing system. As a non-limiting example, the signal processing system can adjust the parameters of an image sensor of a vehicle by determining the geographic location of the vehicle, adjusting the parameters of the image sensor of the vehicle from a first setting to a second setting based on the geographic location of the vehicle, receiving sensor data associated with the image sensor based on the second setting, and processing the sensor data to generate an image.

By virtue of the implementation of systems, methods, and computer program products described herein, an autonomous vehicle can more efficiently and accurately perform image processing. Further, the autonomous vehicle can more efficiently and accurately infer the parameters for an image sensor, adjust the parameters for an image sensor, and generate images of a scene using the image sensor. For example, an autonomous vehicle can reduce sensing latency by using annotated map data, weather data, or other data associated with a particular location to proactively adjust the parameters of an image sensor in response to the location of the autonomous vehicle instead of reactively adjusting the parameters. Additionally, such a reduction in the sensing latency can increase safety for the autonomous vehicle. For example, by reducing the sensing latency, the autonomous vehicle may be able to more quickly and more accurately identify objects and/or features of a scene and react accordingly (e.g., turn to avoid hitting an object in the road).

Referring now to FIG. 1, illustrated is example environment 100 in which vehicles that include autonomous systems, as well as vehicles that do not, are operated. As illustrated, environment 100 includes vehicles 102a-102n, objects 104a-104n, routes 106a-106n, area 108, vehicle-to-infrastructure (V2I) device 110, network 112, remote autonomous vehicle (AV) system 114, fleet management system 116, and V2I system 118. Vehicles 102a-102n, vehicle-to-infrastructure (V2I) device 110, network 112, autonomous vehicle (AV) system 114, fleet management system 116, and V2I system 118 interconnect (e.g., establish a connection to communicate and/or the like) via wired connections, wireless connections, or a combination of wired or wireless connections. In some embodiments, objects 104a-104n interconnect with at least one of vehicles 102a-102n, vehicle-to-infrastructure (V2I) device 110, network 112, autonomous vehicle (AV) system 114, fleet management system 116, and V2I system 118 via wired connections, wireless connections, or a combination of wired or wireless connections.

Vehicles 102a-102n (referred to individually as vehicle 102 and collectively as vehicles 102) include at least one device configured to transport goods and/or people. In some embodiments, vehicles 102 are configured to be in communication with V2I device 110, remote AV system 114, fleet management system 116, and/or V2I system 118 via network 112. In some embodiments, vehicles 102 include cars, buses, trucks, trains, and/or the like. In some embodiments, vehicles 102 are the same as, or similar to, vehicles 200, described herein (see FIG. 2). In some embodiments, a vehicle 200 of a set of vehicles 200 is associated with an autonomous fleet manager. In some embodiments, vehicles 102 travel along respective routes 106a-106n (referred to individually as route 106 and collectively as routes 106), as described herein. In some embodiments, one or more vehicles 102 include an autonomous system (e.g., an autonomous system that is the same as or similar to autonomous system 202).

Objects 104a-104n (referred to individually as object 104 and collectively as objects 104) include, for example, at least one vehicle, at least one pedestrian, at least one cyclist, at least one structure (e.g., a building, a sign, a fire hydrant, etc.), and/or the like. Each object 104 is stationary (e.g., located at a fixed location for a period of time) or mobile (e.g., having a velocity and associated with at least one trajectory). In some embodiments, objects 104 are associated with corresponding locations in area 108.

Routes 106a-106n (referred to individually as route 106 and collectively as routes 106) are each associated with (e.g., prescribe) a sequence of actions (also known as a trajectory) connecting states along which an AV can navigate. Each route 106 starts at an initial state (e.g., a state that corresponds to a first spatiotemporal location, velocity, and/or the like) and a final goal state (e.g., a state that corresponds to a second spatiotemporal location that is different from the first spatiotemporal location) or goal region (e.g., a subspace of acceptable states (e.g., terminal states)). In some embodiments, the first state includes a location at which an individual or individuals are to be picked-up by the AV and the second state or region includes a location or locations at which the individual or individuals picked-up by the AV are to be dropped-off. In some embodiments, routes 106 include a plurality of acceptable state sequences (e.g., a plurality of spatiotemporal location sequences), the plurality of state sequences associated with (e.g., defining) a plurality of trajectories. In an example, routes 106 include only high-level actions or imprecise state locations, such as a series of connected roads dictating turning directions at roadway intersections. Additionally, or alternatively, routes 106 may include more precise actions or states such as, for example, specific target lanes or precise locations within the lane areas and targeted speed at those positions. In an example, routes 106 include a plurality of precise state sequences along the at least one high level action sequence with a limited lookahead horizon to reach intermediate goals, where the combination of successive iterations of limited horizon state sequences cumulatively correspond to a plurality of trajectories that collectively form the high-level route to terminate at the final goal state or region.

Area 108 includes a physical area (e.g., a geographic region) within which vehicles 102 can navigate. In an example, area 108 includes at least one state (e.g., a country, a province, an individual state of a plurality of states included in a country, etc.), at least one portion of a state, at least one city, at least one portion of a city, etc. In some embodiments, area 108 includes at least one named thoroughfare (referred to herein as a "road") such as a highway, an interstate highway, a parkway, a city street, etc. Additionally, or alternatively, in some examples area 108 includes at least one unnamed road such as a driveway, a section of a parking lot, a section of a vacant and/or undeveloped lot, a dirt path, etc. In some embodiments, a road includes at least one lane (e.g., a portion of the road that can be traversed by vehicles 102). In an example, a road includes at least one lane associated with (e.g., identified based on) at least one lane marking.

Vehicle-to-Infrastructure (V2I) device 110 (sometimes referred to as a Vehicle-to-Infrastructure (V2X) device) includes at least one device configured to be in communication with vehicles 102 and/or V2I infrastructure system 118. In some embodiments, V2I device 110 is configured to be in communication with vehicles 102, remote AV system 114, fleet management system 116, and/or V2I system 118 via network 112. In some embodiments, V2I device 110 includes a radio frequency identification (RFID) device, signage, cameras (e.g., two-dimensional (2D) and/or three-dimensional (3D) cameras), lane markers, streetlights, parking meters, etc. In some embodiments, V2I device 110 is configured to communicate directly with vehicles 102. Additionally, or alternatively, in some embodiments V2I device 110 is configured to communicate with vehicles 102, remote AV system 114, and/or fleet management system 116 via V2I system 118. In some embodiments, V2I device 110 is configured to communicate with V2I system 118 via network 112.

Network 112 includes one or more wired and/or wireless networks. In an example, network 112 includes a cellular network (e.g., a long term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN), a private network, an ad hoc network, an intranet, the Internet, a fiber optic-based network, a cloud computing network, etc., a combination of some or all of these networks, and/or the like.

Remote AV system 114 includes at least one device configured to be in communication with vehicles 102, V2I device 110, network 112, remote AV system 114, fleet management system 116, and/or V2I system 118 via network 112. In an example, remote AV system 114 includes a server, a group of servers, and/or other like devices. In some embodiments, remote AV system 114 is co-located with the fleet management system 116. In some embodiments, remote AV system 114 is involved in the installation of some or all of the components of a vehicle, including an autonomous system, an autonomous vehicle compute, software implemented by an autonomous vehicle compute, and/or the like. In some embodiments, remote AV system 114 maintains (e.g., updates and/or replaces) such components and/or software during the lifetime of the vehicle.

Fleet management system 116 includes at least one device configured to be in communication with vehicles 102, V2I device 110, remote AV system 114, and/or V2I infrastructure system 118. In an example, fleet management system 116 includes a server, a group of servers, and/or other like devices. In some embodiments, fleet management system 116 is associated with a ridesharing company (e.g., an organization that controls operation of multiple vehicles (e.g., vehicles that include autonomous systems and/or vehicles that do not include autonomous systems) and/or the like).

In some embodiments, V2I system 118 includes at least one device configured to be in communication with vehicles 102, V2I device 110, remote AV system 114, and/or fleet management system 116 via network 112. In some examples, V2I system 118 is configured to be in communication with V2I device 110 via a connection different from network 112. In some embodiments, V2I system 118 includes a server, a group of servers, and/or other like devices. In some embodiments, V2I system 118 is associated with a municipality or a private institution (e.g., a private institution that maintains V2I device 110 and/or the like).

The number and arrangement of elements illustrated in FIG. 1 are provided as an example. There can be additional elements, fewer elements, different elements, and/or differently arranged elements, than those illustrated in FIG. 1. Additionally, or alternatively, at least one element of environment 100 can perform one or more functions described as being performed by at least one different element of FIG. 1. Additionally, or alternatively, at least one set of elements of environment 100 can perform one or more functions described as being performed by at least one different set of elements of environment 100.

Figure 2:
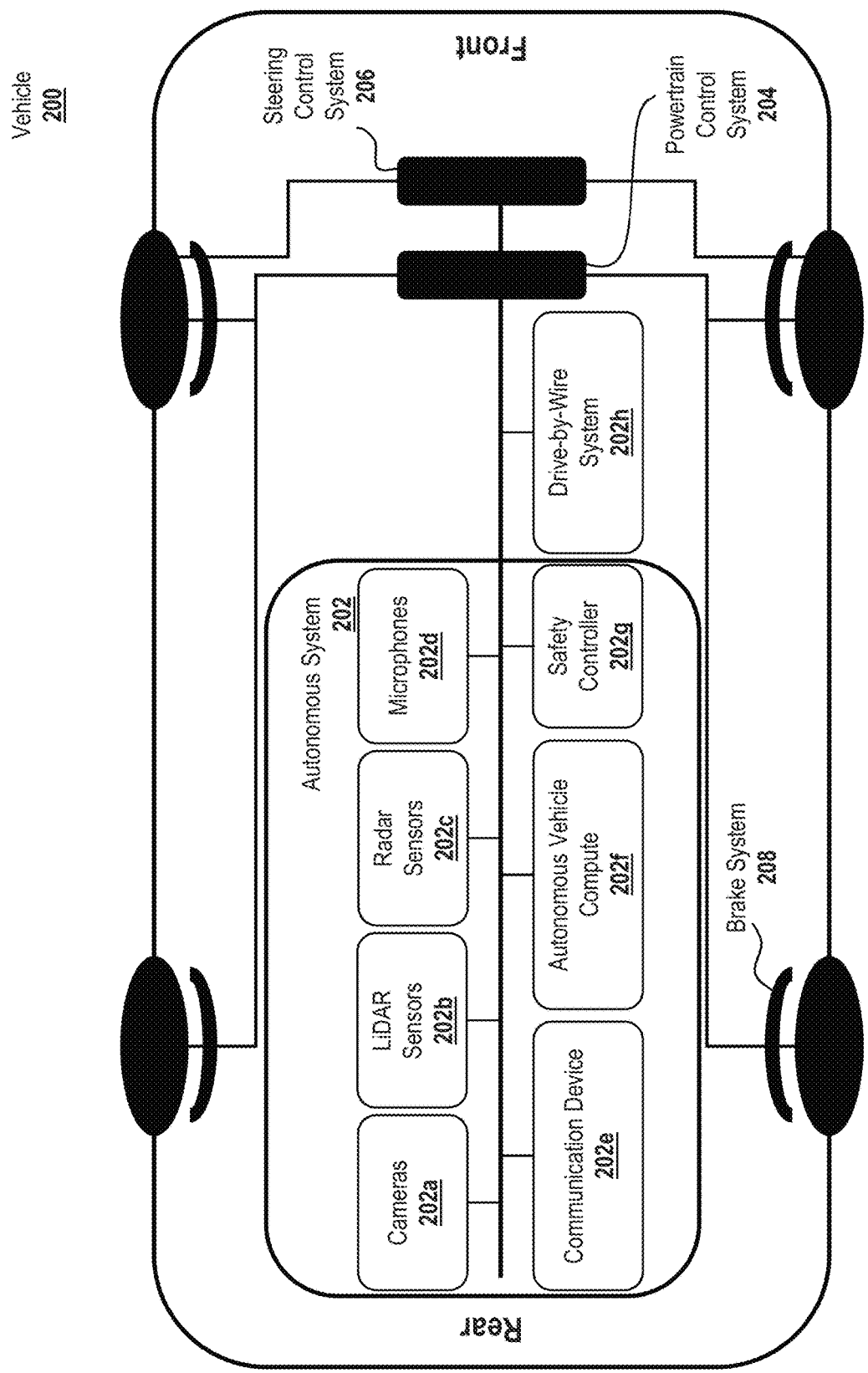
FIG. 2 is a diagram of one or more systems of a vehicle including an autonomous system.

Referring now to FIG. 2, vehicle 200 includes autonomous system 202, powertrain control system 204, steering control system 206, and brake system 208. In some embodiments, vehicle 200 is the same as or similar to vehicle 102 (see FIG. 1). In some embodiments, vehicle 102 have autonomous capability (e.g., implement at least one function, feature, device, and/or the like that enable vehicle 200 to be partially or fully operated without human intervention including, without limitation, fully autonomous vehicles (e.g., vehicles that forego reliance on human intervention), highly autonomous vehicles (e.g., vehicles that forego reliance on human intervention in certain situations), and/or the like). For a detailed description of fully autonomous vehicles and highly autonomous vehicles, reference may be made to SAE International's standard J3016: Taxonomy and Definitions for Terms Related to On-Road Motor Vehicle Automated Driving Systems, which is incorporated by reference in its entirety. In some embodiments, vehicle 200 is associated with an autonomous fleet manager and/or a ridesharing company.

Autonomous system 202 includes a sensor suite that includes one or more devices such as cameras 202a, LiDAR sensors 202b, radar sensors 202c, and microphones 202d. In some embodiments, autonomous system 202 can include more or fewer devices and/or different devices (e.g., ultrasonic sensors, inertial sensors, GPS receivers (discussed below), odometry sensors that generate data associated with an indication of a distance that vehicle 200 has traveled, and/or the like). In some embodiments, autonomous system 202 uses the one or more devices included in autonomous system 202 to generate data associated with environment 100, described herein. The data generated by the one or more devices of autonomous system 202 can be used by one or more systems described herein to observe the environment (e.g., environment 100) in which vehicle 200 is located. In some embodiments, autonomous system 202 includes communication device 202e, autonomous vehicle compute 202f, and drive-by-wire (DBW) system 202h.

Figure 3:
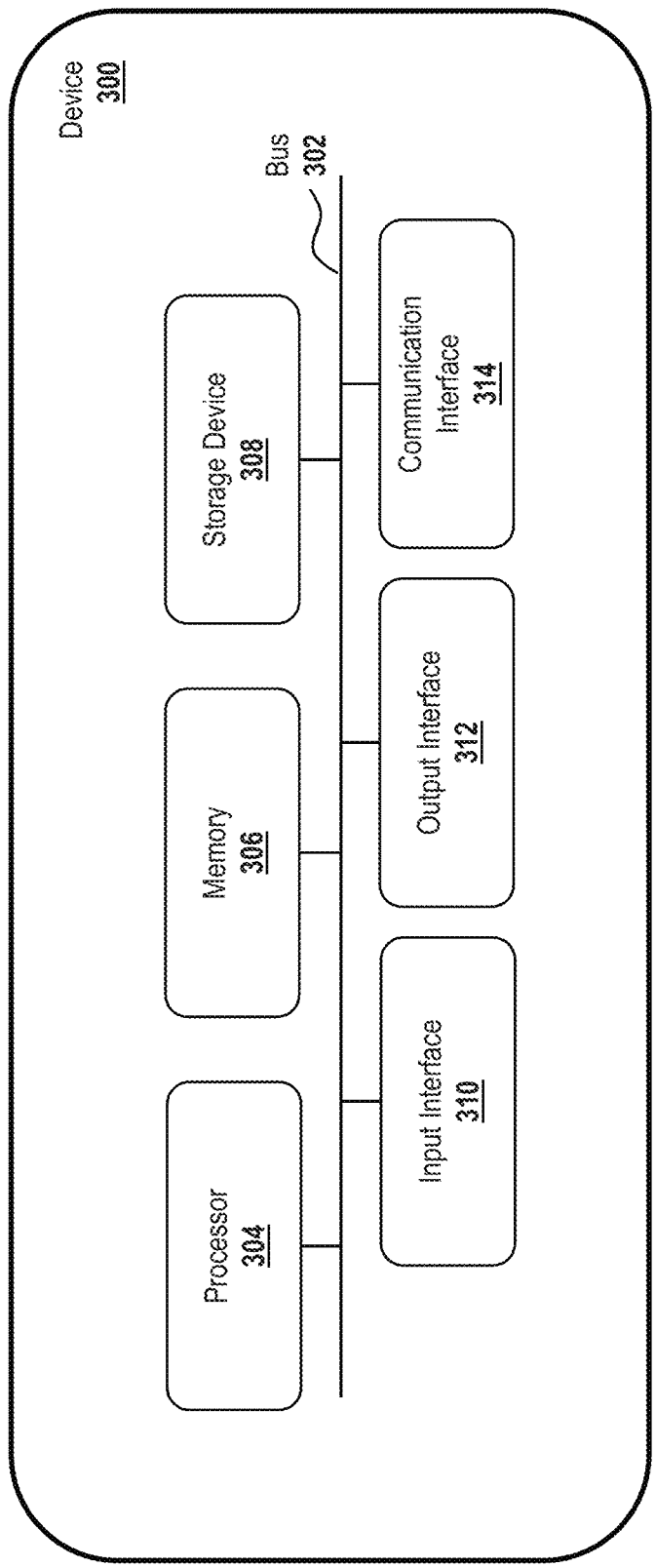
FIG. 3 is a diagram of components of one or more devices and/or one or more systems of FIGS. 1 and 2.

Cameras 202a include at least one device configured to be in communication with communication device 202e, autonomous vehicle compute 202f, and/or safety controller 202g via a bus (e.g., a bus that is the same as or similar to bus 302 of FIG. 3). Cameras 202a include at least one camera (e.g., a digital camera using a light sensor such as a charge-coupled device (CCD), a thermal camera, an infrared (IR) camera, an event camera, and/or the like) to capture images including physical objects (e.g., cars, buses, curbs, people, and/or the like). In some embodiments, camera 202a generates camera data as output. In some examples, camera 202a generates camera data that includes image data associated with an image. In this example, the image data may specify at least one parameter (e.g., image characteristics such as exposure, brightness, etc., an image timestamp, and/or the like) corresponding to the image. In such an example, the image may be in a format (e.g., RAW, JPEG, PNG, and/or the like). In some embodiments, camera 202a includes a plurality of independent cameras configured on (e.g., positioned on) a vehicle to capture images for the purpose of stereopsis (stereo vision). In some examples, camera 202a includes a plurality of cameras that generate image data and transmit the image data to autonomous vehicle compute 202f and/or a fleet management system (e.g., a fleet management system that is the same as or similar to fleet management system 116 of FIG. 1). In such an example, autonomous vehicle compute 202f determines depth to one or more objects in a field of view of at least two cameras of the plurality of cameras based on the image data from the at least two cameras. In some embodiments, cameras 202a is configured to capture images of objects within a distance from cameras 202a (e.g., up to 100 meters, up to a kilometer, and/or the like). Accordingly, cameras 202a include features such as sensors and lenses that are optimized for perceiving objects that are at one or more distances from cameras 202a.

In an embodiment, camera 202a includes at least one camera configured to capture one or more images associated with one or more traffic lights, street signs and/or other physical objects that provide visual navigation information. In some embodiments, camera 202a generates traffic light data associated with one or more images. In some examples, camera 202a generates TLD data associated with one or more images that include a format (e.g., RAW, JPEG, PNG, and/or the like). In some embodiments, camera 202a that generates TLD data differs from other systems described herein incorporating cameras in that camera 202a can include one or more cameras with a wide field of view (e.g., a wide-angle lens, a fish-eye lens, a lens having a viewing angle of approximately 120 degrees or more, and/or the like) to generate images about as many physical objects as possible.

Laser Detection and Ranging (LiDAR) sensors 202b include at least one device configured to be in communication with communication device 202e, autonomous vehicle compute 202f, and/or safety controller 202g via a bus (e.g., a bus that is the same as or similar to bus 302 of FIG. 3). LiDAR sensors 202b include a system configured to transmit light from a light emitter (e.g., a laser transmitter). Light emitted by LiDAR sensors 202b include light (e.g., infrared light and/or the like) that is outside of the visible spectrum. In some embodiments, during operation, light emitted by LiDAR sensors 202b encounters a physical object (e.g., a vehicle) and is reflected back to LiDAR sensors 202b. In some embodiments, the light emitted by LiDAR sensors 202b does not penetrate the physical objects that the light encounters. LiDAR sensors 202b also include at least one light detector which detects the light that was emitted from the light emitter after the light encounters a physical object. In some embodiments, at least one data processing system associated with LiDAR sensors 202b generates an image (e.g., a point cloud, a combined point cloud, and/or the like) representing the objects included in a field of view of LiDAR sensors 202b. In some examples, the at least one data processing system associated with LiDAR sensor 202b generates an image that represents the boundaries of a physical object, the surfaces (e.g., the topology of the surfaces) of the physical object, and/or the like. In such an example, the image is used to determine the boundaries of physical objects in the field of view of LiDAR sensors 202b.

Radio Detection and Ranging (radar) sensors 202c include at least one device configured to be in communication with communication device 202e, autonomous vehicle compute 202f, and/or safety controller 202g via a bus (e.g., a bus that is the same as or similar to bus 302 of FIG. 3). Radar sensors 202c include a system configured to transmit radio waves (either pulsed or continuously). The radio waves transmitted by radar sensors 202c include radio waves that are within a predetermined spectrum. In some embodiments, during operation, radio waves transmitted by radar sensors 202c encounter a physical object and are reflected back to radar sensors 202c. In some embodiments, the radio waves transmitted by radar sensors 202c are not reflected by some objects. In some embodiments, at least one data processing system associated with radar sensors 202c generates signals representing the objects included in a field of view of radar sensors 202c. For example, the at least one data processing system associated with radar sensor 202c generates an image that represents the boundaries of a physical object, the surfaces (e.g., the topology of the surfaces) of the physical object, and/or the like. In some examples, the image is used to determine the boundaries of physical objects in the field of view of radar sensors 202c.

Microphones 202d includes at least one device configured to be in communication with communication device 202e, autonomous vehicle compute 202f, and/or safety controller 202g via a bus (e.g., a bus that is the same as or similar to bus 302 of FIG. 3). Microphones 202d include one or more microphones (e.g., array microphones, external microphones, and/or the like) that capture audio signals and generate data associated with (e.g., representing) the audio signals. In some examples, microphones 202d include transducer devices and/or like devices. In some embodiments, one or more systems described herein can receive the data generated by microphones 202d and determine a position of an object relative to vehicle 200 (e.g., a distance and/or the like) based on the audio signals associated with the data.

Communication device 202e include at least one device configured to be in communication with cameras 202a, LiDAR sensors 202b, radar sensors 202c, microphones 202d, autonomous vehicle compute 202f, safety controller 202g, and/or DBW system 202h. For example, communication device 202e may include a device that is the same as or similar to communication interface 314 of FIG. 3. In some embodiments, communication device 202e includes a vehicle-to-vehicle (V2V) communication device (e.g., a device that enables wireless communication of data between vehicles).

Autonomous vehicle compute 202f include at least one device configured to be in communication with cameras 202a, LiDAR sensors 202b, radar sensors 202c, microphones 202d, communication device 202e, safety controller 202g, and/or DBW system 202h. In some examples, autonomous vehicle compute 202f includes a device such as a client device, a mobile device (e.g., a cellular telephone, a tablet, and/or the like) a server (e.g., a computing device including one or more central processing units, graphical processing units, and/or the like), and/or the like. In some embodiments, autonomous vehicle compute 202f is the same as or similar to autonomous vehicle compute 400, described herein. Additionally, or alternatively, in some embodiments autonomous vehicle compute 202f is configured to be in communication with an autonomous vehicle system (e.g., an autonomous vehicle system that is the same as or similar to remote AV system 114 of FIG. 1), a fleet management system (e.g., a fleet management system that is the same as or similar to fleet management system 116 of FIG. 1), a V2I device (e.g., a V2I device that is the same as or similar to V2I device 110 of FIG. 1), and/or a V2I system (e.g., a V2I system that is the same as or similar to V2I system 118 of FIG. 1).

Safety controller 202g includes at least one device configured to be in communication with cameras 202a, LiDAR sensors 202b, radar sensors 202c, microphones 202d, communication device 202e, autonomous vehicle computer 202f, and/or DBW system 202h. In some examples, safety controller 202g includes one or more controllers (electrical controllers, electromechanical controllers, and/or the like) that are configured to generate and/or transmit control signals to operate one or more devices of vehicle 200 (e.g., powertrain control system 204, steering control system 206, brake system 208, and/or the like). In some embodiments, safety controller 202g is configured to generate control signals that take precedence over (e.g., overrides) control signals generated and/or transmitted by autonomous vehicle compute 202f.

DBW system 202h includes at least one device configured to be in communication with communication device 202e and/or autonomous vehicle compute 202f. In some examples, DBW system 202h includes one or more controllers (e.g., electrical controllers, electromechanical controllers, and/or the like) that are configured to generate and/or transmit control signals to operate one or more devices of vehicle 200 (e.g., powertrain control system 204, steering control system 206, brake system 208, and/or the like). Additionally, or alternatively, the one or more controllers of DBW system 202h are configured to generate and/or transmit control signals to operate at least one different device (e.g., a turn signal, headlights, door locks, windshield wipers, and/or the like) of vehicle 200.

Powertrain control system 204 includes at least one device configured to be in communication with DBW system 202h. In some examples, powertrain control system 204 includes at least one controller, actuator, and/or the like. In some embodiments, powertrain control system 204 receives control signals from DBW system 202h and powertrain control system 204 causes vehicle 200 to start moving forward, stop moving forward, start moving backward, stop moving backward, accelerate in a direction, decelerate in a direction, perform a left turn, perform a right turn, and/or the like. In an example, powertrain control system 204 causes the energy (e.g., fuel, electricity, and/or the like) provided to a motor of the vehicle to increase, remain the same, or decrease, thereby causing at least one wheel of vehicle 200 to rotate or not rotate.

Steering control system 206 includes at least one device configured to rotate one or more wheels of vehicle 200. In some examples, steering control system 206 includes at least one controller, actuator, and/or the like. In some embodiments, steering control system 206 causes the front two wheels and/or the rear two wheels of vehicle 200 to rotate to the left or right to cause vehicle 200 to turn to the left or right.

Brake system 208 includes at least one device configured to actuate one or more brakes to cause vehicle 200 to reduce speed and/or remain stationary. In some examples, brake system 208 includes at least one controller and/or actuator that is configured to cause one or more calipers associated with one or more wheels of vehicle 200 to close on a corresponding rotor of vehicle 200. Additionally, or alternatively, in some examples brake system 208 includes an automatic emergency braking (AEB) system, a regenerative braking system, and/or the like.

In some embodiments, vehicle 200 includes at least one platform sensor (not explicitly illustrated) that measures or infers properties of a state or a condition of vehicle 200. In some examples, vehicle 200 includes platform sensors such as a global positioning system (GPS) receiver, an inertial measurement unit (IMU), a wheel speed sensor, a wheel brake pressure sensor, a wheel torque sensor, an engine torque sensor, a steering angle sensor, and/or the like.

Referring now to FIG. 3, illustrated is a schematic diagram of a device 300. As illustrated, device 300 includes processor 304, memory 306, storage component 308, input interface 310, output interface 312, communication interface 314, and bus 302. In some embodiments, device 300 corresponds to at least one device of vehicles 102 (e.g., at least one device of a system of vehicles 102), and/or one or more devices of network 112 (e.g., one or more devices of a system of network 112). In some embodiments, one or more devices of vehicles 102 (e.g., one or more devices of a system of vehicles 102), and/or one or more devices of network 112 (e.g., one or more devices of a system of network 112) include at least one device 300 and/or at least one component of device 300. As shown in FIG. 3, device 300 includes bus 302, processor 304, memory 306, storage component 308, input interface 310, output interface 312, and communication interface 314.

Bus 302 includes a component that permits communication among the components of device 300. In some embodiments, processor 304 is implemented in hardware, software, or a combination of hardware and software. In some examples, processor 304 includes a processor (e.g., a central processing unit (CPU), a graphics processing unit (GPU), an accelerated processing unit (APU), and/or the like), a microphone, a digital signal processor (DSP), and/or any processing component (e.g., a field-programmable gate array (FPGA), an application specific integrated circuit (ASIC), and/or the like) that can be programmed to perform at least one function. Memory 306 includes random access memory (RAM), read-only memory (ROM), and/or another type of dynamic and/or static storage device (e.g., flash memory, magnetic memory, optical memory, and/or the like) that stores data and/or instructions for use by processor 304.

Storage component 308 stores data and/or software related to the operation and use of device 300. In some examples, storage component 308 includes a hard disk (e.g., a magnetic disk, an optical disk, a magneto-optic disk, a solid-state disk, and/or the like), a compact disc (CD), a digital versatile disc (DVD), a floppy disk, a cartridge, a magnetic tape, a CD-ROM, RAM, PROM, EPROM, FLASH-EPROM, NV-RAM, and/or another type of computer readable medium, along with a corresponding drive.

Input interface 310 includes a component that permits device 300 to receive information, such as via user input (e.g., a touchscreen display, a keyboard, a keypad, a mouse, a button, a switch, a microphone, a camera, and/or the like). Additionally, or alternatively, in some embodiments input interface 310 includes a sensor that senses information (e.g., a global positioning system (GPS) receiver, an accelerometer, a gyroscope, an actuator, and/or the like). Output interface 312 includes a component that provides output information from device 300 (e.g., a display, a speaker, one or more light-emitting diodes (LEDs), and/or the like).

In some embodiments, communication interface 314 includes a transceiver-like component (e.g., a transceiver, a separate receiver and transmitter, and/or the like) that permits device 300 to communicate with other devices via a wired connection, a wireless connection, or a combination of wired and wireless connections. In some examples, communication interface 314 permits device 300 to receive information from another device and/or provide information to another device. In some examples, communication interface 314 includes an Ethernet interface, an optical interface, a coaxial interface, an infrared interface, a radio frequency (RF) interface, a universal serial bus (USB) interface, a Wi-Fi® interface, a cellular network interface, and/or the like.

In some embodiments, device 300 performs one or more processes described herein. Device 300 performs these processes based on processor 304 executing software instructions stored by a computer-readable medium, such as memory 305 and/or storage component 308. A computer-readable medium (e.g., a non-transitory computer readable medium) is defined herein as a non-transitory memory device. A non-transitory memory device includes memory space located inside a single physical storage device or memory space spread across multiple physical storage devices.

In some embodiments, software instructions are read into memory 306 and/or storage component 308 from another computer-readable medium or from another device via communication interface 314. When executed, software instructions stored in memory 306 and/or storage component 308 cause processor 304 to perform one or more processes described herein. Additionally, or alternatively, hardwired circuitry is used in place of or in combination with software instructions to perform one or more processes described herein. Thus, embodiments described herein are not limited to any specific combination of hardware circuitry and software unless explicitly stated otherwise.

Memory 306 and/or storage component 308 includes data storage or at least one data structure (e.g., a database and/or the like). Device 300 is capable of receiving information from, storing information in, communicating information to, or searching information stored in the data storage or the at least one data structure in memory 306 or storage component 308. In some examples, the information includes network data, input data, output data, or any combination thereof.

In some embodiments, device 300 is configured to execute software instructions that are either stored in memory 306 and/or in the memory of another device (e.g., another device that is the same as or similar to device 300). As used herein, the term "module" refers to at least one instruction stored in memory 306 and/or in the memory of another device that, when executed by processor 304 and/or by a processor of another device (e.g., another device that is the same as or similar to device 300) cause device 300 (e.g., at least one component of device 300) to perform one or more processes described herein. In some embodiments, a module is implemented in software, firmware, hardware, and/or the like.

The number and arrangement of components illustrated in FIG. 3 are provided as an example. In some embodiments, device 300 can include additional components, fewer components, different components, or differently arranged components than those illustrated in FIG. 3. Additionally, or alternatively, a set of components (e.g., one or more components) of device 300 can perform one or more functions described as being performed by another component or another set of components of device 300.

Figure 4:
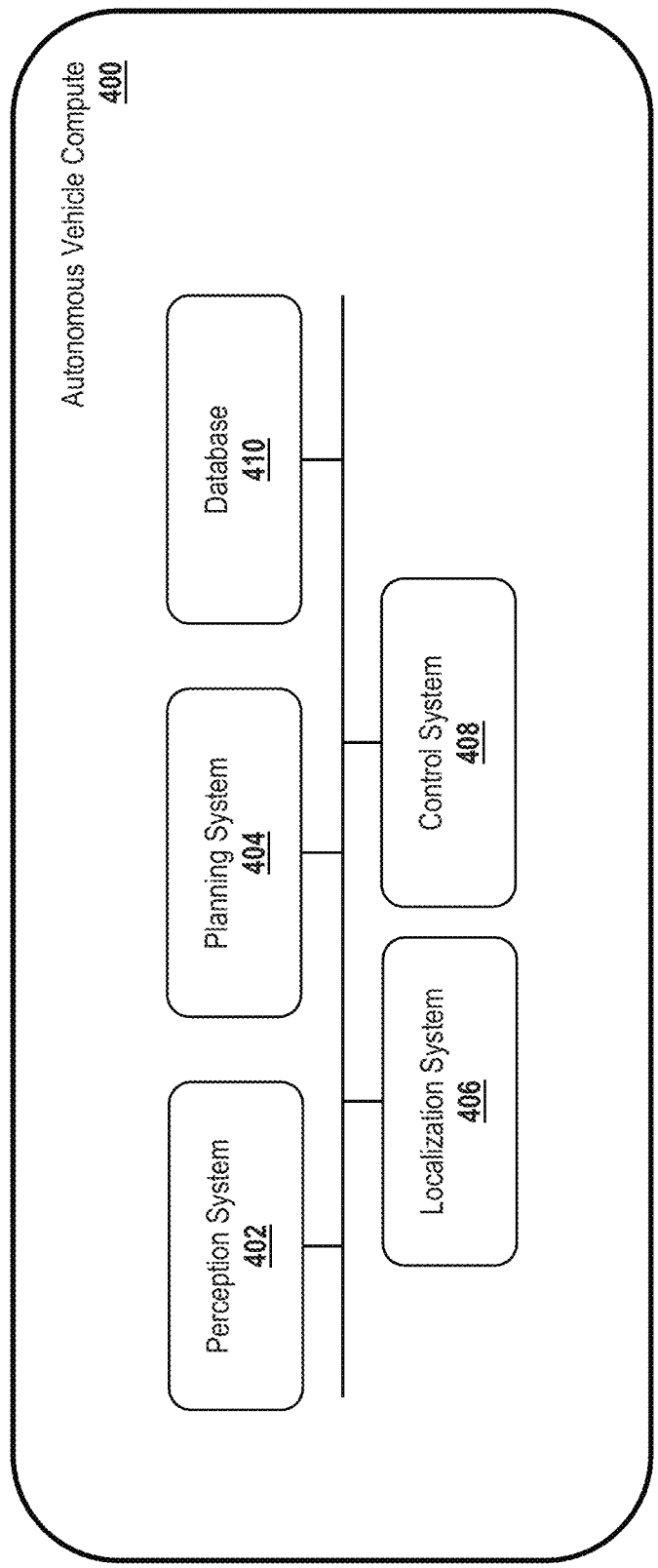
FIG. 4 is a diagram of certain components of an autonomous system.

Referring now to FIG. 4, illustrated is an example block diagram of an autonomous vehicle compute 400 (sometimes referred to as an "AV stack"). As illustrated, autonomous vehicle compute 400 includes perception system 402 (sometimes referred to as a perception module), planning system 404 (sometimes referred to as a planning module), localization system 406 (sometimes referred to as a localization module), control system 408 (sometimes referred to as a control module), and database 410. In some embodiments, perception system 402, planning system 404, localization system 406, control system 408, and database 410 are included and/or implemented in an autonomous navigation system of a vehicle (e.g., autonomous vehicle compute 202f of vehicle 200). Additionally, or alternatively, in some embodiments perception system 402, planning system 404, localization system 406, control system 408, and database 410 are included in one or more standalone systems (e.g., one or more systems that are the same as or similar to autonomous vehicle compute 400 and/or the like). In some examples, perception system 402, planning system 404, localization system 406, control system 408, and database 410 are included in one or more standalone systems that are located in a vehicle and/or at least one remote system as described herein. In some embodiments, any and/or all of the systems included in autonomous vehicle compute 400 are implemented in software (e.g., in software instructions stored in memory), computer hardware (e.g., by microprocessors, microcontrollers, application-specific integrated circuits [ASICs], Field Programmable Gate Arrays (FPGAs), and/or the like), or combinations of computer software and computer hardware. It will also be understood that, in some embodiments, autonomous vehicle compute 400 is configured to be in communication with a remote system (e.g., an autonomous vehicle system that is the same as or similar to remote AV system 114, a fleet management system 116 that is the same as or similar to fleet management system 116, a V2I system that is the same as or similar to V2I system 118, and/or the like).

In some embodiments, perception system 402 receives data associated with at least one physical object (e.g., data that is used by perception system 402 to detect the at least one physical object) in an environment and classifies the at least one physical object. In some examples, perception system 402 receives image data captured by at least one camera (e.g., cameras 202a), the image associated with (e.g., representing) one or more physical objects within a field of view of the at least one camera. In such an example, perception system 402 classifies at least one physical object based on one or more groupings of physical objects (e.g., bicycles, vehicles, traffic signs, pedestrians, and/or the like). In some embodiments, perception system 402 transmits data associated with the classification of the physical objects to planning system 404 based on perception system 402 classifying the physical objects.

In some embodiments, planning system 404 receives data associated with a destination and generates data associated with at least one route (e.g., routes 106) along which a vehicle (e.g., vehicles 102) can travel along toward a destination. In some embodiments, planning system 404 periodically or continuously receives data from perception system 402 (e.g., data associated with the classification of physical objects, described above) and planning system 404 updates the at least one trajectory or generates at least one different trajectory based on the data generated by perception system 402. In some embodiments, planning system 404 receives data associated with an updated position of a vehicle (e.g., vehicles 102) from localization system 406 and planning system 404 updates the at least one trajectory or generates at least one different trajectory based on the data generated by localization system 406.

In some embodiments, localization system 406 receives data associated with (e.g., representing) a location of a vehicle (e.g., vehicles 102) in an area. In some examples, localization system 406 receives LiDAR data associated with at least one point cloud generated by at least one LiDAR sensor (e.g., LiDAR sensors 202b). In certain examples, localization system 406 receives data associated with at least one point cloud from multiple LiDAR sensors and localization system 406 generates a combined point cloud based on each of the point clouds. In these examples, localization system 406 compares the at least one point cloud or the combined point cloud to two-dimensional (2D) and/or a three-dimensional (3D) map of the area stored in database 410. Localization system 406 then determines the position of the vehicle in the area based on localization system 406 comparing the at least one point cloud or the combined point cloud to the map. In some embodiments, the map includes a combined point cloud of the area generated prior to navigation of the vehicle. In some embodiments, maps include, without limitation, high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations thereof), and maps describing the spatial locations of road features such as crosswalks, traffic signs or other travel signals of various types. In some embodiments, the map is generated in real-time based on the data received by the perception system.

In another example, localization system 406 receives Global Navigation Satellite System (GNSS) data generated by a global positioning system (GPS) receiver. In some examples, localization system 406 receives GNSS data associated with the location of the vehicle in the area and localization system 406 determines a latitude and longitude of the vehicle in the area. In such an example, localization system 406 determines the position of the vehicle in the area based on the latitude and longitude of the vehicle. In some embodiments, localization system 406 generates data associated with the position of the vehicle. In some examples, localization system 406 generates data associated with the position of the vehicle based on localization system 406 determining the position of the vehicle. In such an example, the data associated with the position of the vehicle includes data associated with one or more semantic properties corresponding to the position of the vehicle.

In some embodiments, control system 408 receives data associated with at least one trajectory from planning system 404 and control system 408 controls operation of the vehicle. In some examples, control system 408 receives data associated with at least one trajectory from planning system 404 and control system 408 controls operation of the vehicle by generating and transmitting control signals to cause a powertrain control system (e.g., DBW system 202h, powertrain control system 204, and/or the like), a steering control system (e.g., steering control system 206), and/or a brake system (e.g., brake system 208) to operate. In an example, where a trajectory includes a left turn, control system 408 transmits a control signal to cause steering control system 206 to adjust a steering angle of vehicle 200, thereby causing vehicle 200 to turn left. Additionally, or alternatively, control system 408 generates and transmits control signals to cause other devices (e.g., headlights, turn signal, door locks, windshield wipers, and/or the like) of vehicle 200 to change states.

In some embodiments, perception system 402, planning system 404, localization system 406, and/or control system 408 implement at least one machine learning model (e.g., at least one multilayer perceptron (MLP), at least one convolutional neural network (CNN), at least one recurrent neural network (RNN), at least one autoencoder, at least one transformer, and/or the like). In some examples, perception system 402, planning system 404, localization system 406, and/or control system 408 implement at least one machine learning model alone or in combination with one or more of the above-noted systems. In some examples, perception system 402, planning system 404, localization system 406, and/or control system 408 implement at least one machine learning model as part of a pipeline (e.g., a pipeline for identifying one or more objects located in an environment and/or the like).

Database 410 stores data that is transmitted to, received from, and/or updated by perception system 402, planning system 404, localization system 406 and/or control system 408. In some examples, database 410 includes a storage component (e.g., a storage component that is the same as or similar to storage component 308 of FIG. 3) that stores data and/or software related to the operation and uses at least one system of autonomous vehicle compute 400. In some embodiments, database 410 stores data associated with 2D and/or 3D maps of at least one area. In some examples, database 410 stores data associated with 2D and/or 3D maps of a portion of a city, multiple portions of multiple cities, multiple cities, a county, a state, a State (e.g., a country), and/or the like). In such an example, a vehicle (e.g., a vehicle that is the same as or similar to vehicles 102 and/or vehicle 200) can drive along one or more drivable regions (e.g., single-lane roads, multi-lane roads, highways, back roads, off road trails, and/or the like) and cause at least one LiDAR sensor (e.g., a LiDAR sensor that is the same as or similar to LiDAR sensors 202b) to generate data associated with an image representing the objects included in a field of view of the at least one LiDAR sensor.

In some embodiments, database 410 can be implemented across a plurality of devices. In some examples, database 410 is included in a vehicle (e.g., a vehicle that is the same as or similar to vehicles 102 and/or vehicle 200), an autonomous vehicle system (e.g., an autonomous vehicle system that is the same as or similar to remote AV system 114, a fleet management system (e.g., a fleet management system that is the same as or similar to fleet management system 116 of FIG. 1, a V2I system (e.g., a V2I system that is the same as or similar to V2I system 118 of FIG. 1) and/or the like.

Adjusting Sensor Parameters Based on Geographic Locations

As a vehicle moves between areas or geographic locations, the lighting characteristics (e.g., the amount, type, quality, etc. of light) of the environment around the vehicle can vary significantly. For example, the lighting characteristics when the vehicle is inside of a tunnel may be significantly different from the lighting characteristics when the vehicle is outside of the tunnel. Image sensors of the vehicle may react to the changing lighting characteristics and adjust how sensor data is produced based on the changing lighting characteristics.

However, can be a lag between the vehicle entering an area with different lighting characteristics and the image sensor adjusting its parameters to the "new" lighting characteristics. For example, when a vehicle enters a tunnel it may take some time for the image sensor to registered the changed lighting characteristics to adjust its parameters. There can be a similar lag as the vehicle exits the tunnel. This lag can make it difficult for a perception system (e.g., of an autonomous vehicle) to quickly and accurately identify objects or features of an image. For example, during the time between the vehicle entering an area with different lighting characteristics and the image sensor adjusting its parameters to the changed lighting characteristics, the images produced by the image sensor may be overexposed or underexposed, thereby making it difficult for the perception system to detect objects in the images. This can also lead to an inadequate user experience as the perception system may be limited to reacting to the changing lighting characteristics.

To address these issues, a perception system can use a geographic location of the vehicle and/or one or more environmental characteristics associated with the geographic location of the vehicle to adjust the parameters of the image sensor as the vehicle transitions between the different areas. In some cases, the perception system can proactively adjust the parameters of the image sensor prior to receiving sensor data based on changed lighting characteristics. By proactively adjusting the parameters of the image sensor based on the geographic location and/or the environmental factors associated with the geographic location, the perception system can reduce the lag experienced by the image sensor.

In some cases, the signal processing system can determine the geographic location and, based on the geographic location, identify lighting data, time of day data, weather data, geographic features data, artificial features data, or any other data associated with the geographic location. Based on the identified data, the signal processing system can identify settings for the parameters of an image sensor of the vehicle for the geographic location. For example, the signal processing system may determine that a particular level of tint is required for sensor data received at or associated with a particular geographic location.

Further, the signal processing system may proactively determine the signal processing settings for a particular geographic location prior to and/or as the vehicle enters the particular geographic location. Therefore, the signal processing system can improve the speed and accuracy of image processing for a vehicle. For example, the use of a geographic location of the vehicle to adjust settings of the parameters of an image sensor and/or the signal processing system improves the ability of the signal processing system to obtain accurate sensor data, accurately process the sensor data, and generate an image from the sensor data in order for a perception system to accurately detect objects of interest within the image (e.g., determine whether a particular object is an animate object or an inanimate object).

Further, the settings for the parameters of the imager sensor may be based on data associated with a particular user and/or data associated with a plurality of users. For example, the signal processing system may identify the settings as the vehicle travels (e.g., visits the geographic location) and/or determine the settings from data (e.g., an annotated map) provided by a different system (e.g., a signal processing system of another vehicle).

Figure 5:
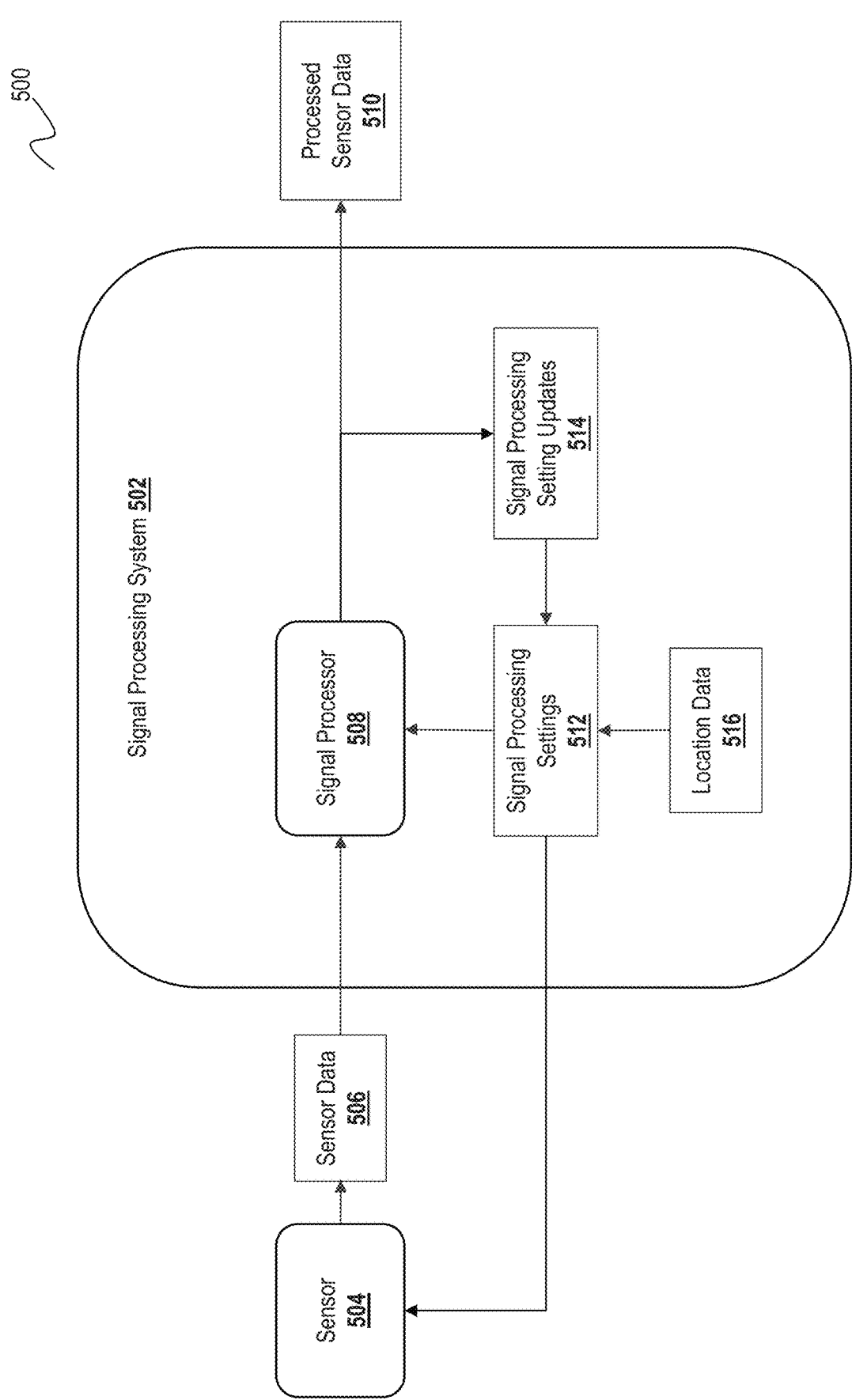
FIG. 5 is a block diagram illustrating an example of a signal processing system.

FIG. 5 is a block diagram illustrating an example of a signal processing environment 500. In the illustrated example, the signal processing environment 500 includes a signal processing system 502 communicatively coupled with a sensor 504. In some cases, the signal processing environment 500 and/or the signal processing system 502 can form at least a part of the perception system 402, described herein at least with reference to FIG. 4.

The sensor 504 generates sensor data 506 based on one or more sensor signal processing settings or parameters 512 and communicates the sensor data 506 to the signal processing system 502. The sensor 504 can include any one or any combination of a camera 202a, LiDAR sensor 202b, radar sensor 202c, etc., similar to that described above with reference to FIG. 2. Similarly, the sensor data 506 can include different types of sensor data, such as camera data associated with a camera image, radar data associated with a radar image, and/or LiDAR data associated with a lidar image, etc. The sensor signal processing settings 512 can include one or more settings for any one or any combination of white balance, gain, tint, exposure, color balance, saturation, etc.

In some embodiments, the signal processing system 502 may obtain the sensor data 506 from a different component. Further, the one or more sensors 504 and/or a different component can perform preliminary signal processing to modify the sensor data 506 prior to the signal processing system 502 obtaining the sensor data 506.

The signal processing system 502 includes a signal processor 508 configured to process the sensor data 506 based on or using one or more signal processing settings 512 to generate processed sensor data 510. For example, the signal processor 508 can adjust the tint, white balance, gain, exposure, color balance, saturation, or any other features of the sensor data 506.

The signal processor 508 of the signal processing system 502 can process the sensor data 506 prior to providing processed sensor data 510 as an output. The signal processor 508 can perform a variety of signal processing tasks on the sensor data 506. For example, the signal processor 508 can modify one or more of white balance, gain, tint, exposure, color balance, saturation, etc.

The sensor data 506 may include sensor data at arbitrary or preset levels or values. In some cases, the signal processor 508 can modify the sensor data 506 from the preset levels to modified values. For example, the signal processing 506 may modify the white balance of the sensor data 506 from an initial, preset level to a modified level. In some cases, the signal processor 508 process the sensor data 506 based on settings or parameters of the signal processor 508. For example, the settings of the signal processor 508 may indicate how to process the sensor data 506.

The perception system 402 can use the processed sensor data 510 generated by the signal processing system 502 to detect particular objects or features in an image or scene. The vehicle 200 can utilize the detected objects or features to make driving or path decisions.

It will be understood that the signal processing system 502 can include fewer, more, or different components. For example, the signal processing system 502 can include multiple signal processors 508 performing different processing function on the sensor data 506 and/or processing sensor data 506 from different sensors 504.

The signal processor 508 can also generate signal processing setting updates 514 for the signal processing settings 512. As described herein, in some cases, the signal processing settings 512 used by the sensor 504 and/or the signal processor 508 may be updated based on an analysis of the sensor data 506 by the signal processor 508. For example, the signal processor 508 may determine, from sensor data 506 associated with an image, that the image is overexposed or underexposed in a manner that increases the difficulty of the perception system 402 to identify objects in the image (e.g., the exposure level of the sensor data 506 satisfies an exposure level threshold). Based on this determination, the signal processor 508 can generate signal processing setting updates 514 for the signal processing settings 512 to improve the sensor data 506 generated by the sensor 504 and/or improve the manner in which the sensor data 506 is processed by the signal processor 508. As there may be a lag between the time the signal processor 508 generates the signal processing setting updates 514 and those updates are propagated to the sensor 504 and/or to the signal processor 508, there may be a time in which the vehicle 200 uses overexposed or underexposed images to make driving determinations, which may decrease the safety or effectiveness of the vehicle 200.

To improve the safety and effectiveness of the vehicle 200, the signal processing system 502 can dynamically select or update the signal processing settings 512 based on information in addition to or other than feedback from, or a data analysis by, the signal processor 508. For example, the signal processing system 502 can use location data 516 associated with a location of the vehicle 200 and/or environmental data associated with an environment of the vehicle 200 to dynamically select or update the signal processing settings 512 used by the sensor 504 to generate the sensor data 506 and/or used by the signal processor 508 to process the sensor data 506. The environmental data associated with the environment can be obtained from sources other than the sensor 504. For example, the environmental data can include, but is not limited to, time of day data, weather data associated with the weather at the determined location, etc. In some cases, the signal processing system 502 can adjust the signal processing settings a priori or prior to the signal processor 508 determining an error with sensor data 506. For example, if the signal processing system 502 determines that the vehicle 200 is about to enter a tunnel, which has significantly less light than the area preceding the tunnel, the signal processing system 502 can adjust the signal processing settings 512 for the sensor 504 before or as the vehicle 200 enters the tunnel. In this way, the signal processor 508 is less likely to receive sensor data 506 associated with an image that is overexposed or underexposed.

To proactively adjust the settings of the signal processing prior to changes in conditions, the signal processing system 502 may determine and/or obtain the location data 516 of the vehicle. The location data 516 of the vehicle may identify a current geographic location of the vehicle, a previous geographic location of the vehicle, and/or a future or predicted location of the vehicle. For example, a user of the vehicle may request transportation to a particular destination and the signal processing system 502 may obtain a predicted route of the vehicle from the origin of the vehicle to the destination and a current location of the vehicle. Therefore, the signal processing system 502 may predict the geographic location of the vehicle at different times (e.g., at the current time or at a future time). Based on the location data 516 of the vehicle, the signal processing system 502 can determine or select signal processing settings 512 for the signal processor 508 and/or the sensor 504.

In some cases, a geographic location may be associated with a particular group of signal processing settings. Further, the group of signal processing settings for a particular geographic location may be trained or learned. For example, the signal processing system 502 (or a different signal processing system) may identify preferred signal processing settings for a particular geographic location.

In some cases, the signal processing system 502 may receive settings from a different signal processing system identifying the preferred signal processing settings for the particular geographic location. For example, the signal processing system 502 may receive an annotated map with signal processing settings for one or more geographic locations. Further, the signal processing system 502 may store and update an annotated map with annotations identifying signal processing settings for different geographic locations.

In some cases, the signal processing settings may be based on light sources (e.g., the brightness, location, color temperature, or other features of the light sources) and/or lighting conditions at the particular geographic location. For example, the signal processing system 502 may determine that the geographic location includes a plurality of light sources with particular features and may determine the signal processing settings based on the plurality of lighting sources.

In some embodiments, the signal processing settings may be based on time of day information. For example, the signal processing system 502 may determine that the time of day is evening (e.g., after sunset). Based on this information, the signal processing system 502 may determine the signal processing settings (e.g., the signal processing system 502 may determine that the white balance should be adjusted based on the time of day being evening).

The signal processing system 502 can utilize weather data, sun angle, etc. based on the location data 516 to determine the signal processing settings 512. For example, the geographic location may be associated with a particular sun angle and particular weather data and the signal processing system 502 may identify the sun angle and weather data associated with the geographic location in order to determine the signal processing settings 512. Therefore, the signal processing system 502 can utilize the location data 516 in order to determine the signal processing settings 512 for the signal processing 506 and/or for the generation of sensor data 506 by the sensor 504.

The signal processing system 502 can use the determined or selected signal processing settings 512 to adjust the signal processing settings for the signal processor 508 and/or the sensor 504. It will be understood that different signal processing settings 512 can be used by the sensor 504 and signal processor 508. For example, the signal processing settings 512 for the sensor can include settings for how to capture and/or generate the sensor data 506, such as, white balance, gain, tint, exposure, color balance, and/or saturation, and the signal processing settings 512 for the signal processor can include settings for how to adjust, modify, or process the sensor data 506.

The sensor 504 can use the signal processing settings 512 to generate additional sensor data 506 and the signal processing system 502 can utilize the signal processing settings 512 to process the additional sensor data 506. In some cases, using the signal processing settings 512, the signal processing system 502 can adjust how the sensor 504 captures the sensor data 506 and adjust how the signal processor 508 processes the sensor data 506. For example, using (or based on) the signal processing settings 512, the sensor 504 can generate sensor data 506 with a different setting for white balance, gain, tint, exposure, color balance, and/or saturation, etc. Similarly, using (or based on) the signal processing settings 512, the signal processor 508 can adjust the sensor data 506 with a different setting for white balance, gain, tint, exposure, color balance, and/or saturation, etc. to generate processed sensor data 506.

In addition, the signal processing system 502 can modify the selected signal processing settings based on an analysis of images captured using the selected signal processing settings. For example, if images generated after the selected signal processing settings are in place remain overexposed or underexposed (or have some other quality issue), the signal processing system 502 can adjust the signal processing settings to obtain a quality level that satisfies a quality threshold. The quality threshold can be determined by the planning system 404 or other system and can be based on whether objects can be extracted from the image, etc.

The signal processing system 502 can analyze the sensor data 506 to generate signal processing setting updates 514. For example, the signal processor 508 can analyze the sensor data 506 to determine whether the signal processing settings 512 should be revised (a posteriori). For example, the signal processor 508 can determine additional adjustments to be made to the white balance, gain, tint, exposure, color balance, saturation, etc. of the sensor data 506 to satisfy a quality threshold. The quality threshold can be determined by the perception system 402 or planning system 404 to indicate whether the parameters of the image satisfy certain threshold to enable the vehicle compute 400 to identify objects in the image and plan a route.

In certain cases, the signal processing system 502 can update signal processing settings associated with a geographic location based on the analysis of the images. For example, after adjusting the selected signal processing settings based on the analysis of images generated using the selected signal processing settings, the signal processing system 502 may determine that the adjustments are to be used for the vehicle or other vehicles at the geographic location in the future. In some such cases, the adjustments can then become the signal processing settings associated with the geographic location that are automatically used when a vehicle is at the geographic location.

In some cases, the signal processor 508 performs the data analysis in order to verify that the output of the signal processing system 502 satisfies particular constraints and/or to fine tune the signal processing settings 512. Based on the analysis of the sensor data 506, the signal processor 508 can generate the signal processing setting updates 514. The signal processing setting updates 514 can include one or more updates for the signal processing settings 512. Based on the signal processing setting updates 514, the signal processing system 502 may adjust the signal processing settings 512, and propagate the adjusted signal processing settings to the signal processor 508 and/or the sensor 504.

In some cases, the signal processing system 502 can adjust signal processing settings 512 for one or more geographic locations based on the a posteriori updates to the signal processing settings 512. For example, the signal processing system 502 may determine that the vehicle or other vehicles at that geographic location are to use the revised signal processing settings 512. As such, the signal processing system 502 can associate the revised signal processing settings 512 with the particular geographic location so that future vehicles at that geographic location automatically adjust their signal processing settings 512 to the revised signal processing settings 512.

Changing Geographic Locations of a Vehicle

Figure 6:
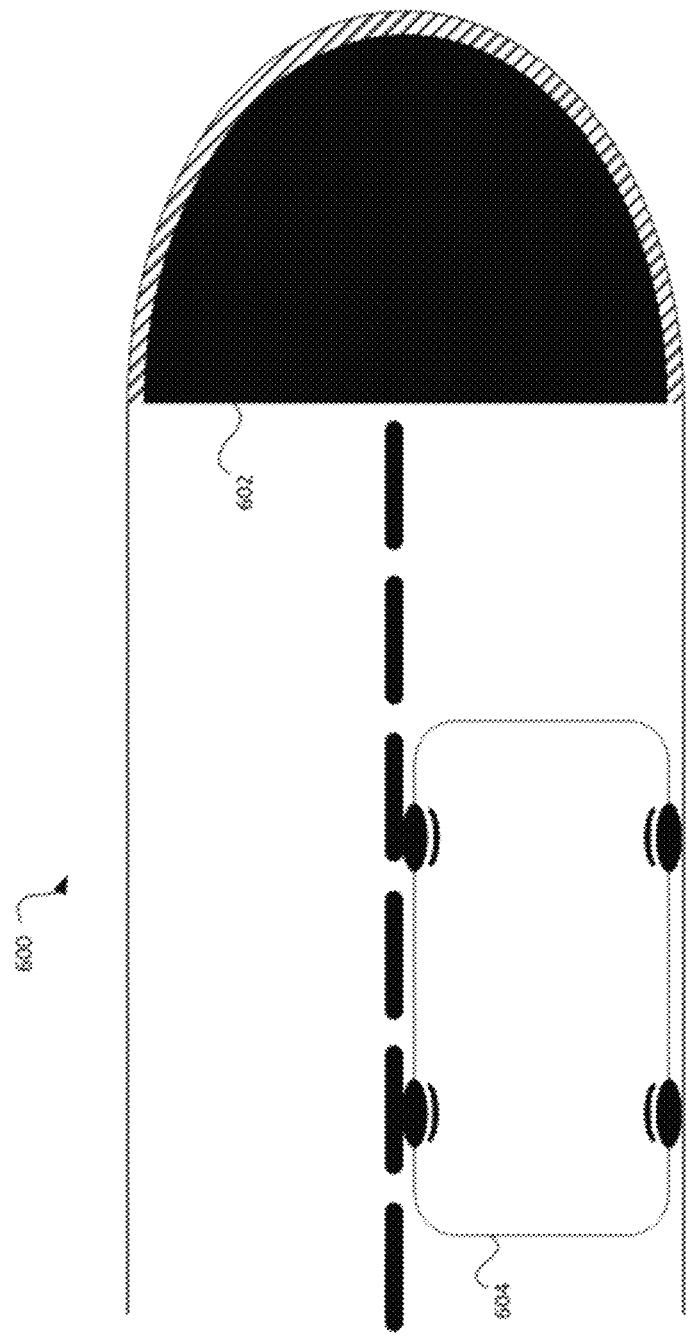
FIG. 6 is an example environment in which a vehicle including one or more components of an autonomous system can be implemented.

FIG. 6 is an example environment 600 illustrating an example of a vehicle 604 moving from one area to another area in which the lighting characteristics (e.g., the amount, type, quality, etc. of light captured by a sensor of the vehicle 604) are significantly different (e.g., based on the lighting and/or shade produced at different times, different seasons, different geographic locations, etc.). For example, the lighting characteristics may be significantly different at 7:00 AM as compared to 12:00 PM or 9:00 PM (e.g., based on the position of the sun). Further, the lighting characteristics may be significantly different at 7:00 AM during the winter as compared to 7:00 AM during the summer as compared to 7:00 AM during the winter. Additionally, the lighting characteristics may be significantly different at different time periods during the night. For example, lighting characteristics at 8:00 PM, 10:00 PM, and 11:45 PM may vary significantly based on artificial light sources (e.g., street lamps may be turned on at 8:30 PM and turned off at 111:30 PM, significantly affecting the lighting characteristics. Further, the lighting characteristics may vary significantly based on a location of the vehicle. For example, the lighting characteristics may be significantly different at a location within a tunnel as compared to a location outside of a tunnel. The vehicle 604 can include the signal processing system 502 to process sensor data 506 from sensors 504 of the vehicle 200. For example, the vehicle 200 may include a signal processing system 502 to process camera data, LiDAR data, and/or radar data.

As described herein, the signal processing system 502 can proactively adjust the signal processing settings 512 for generating or processing the sensor data 506 based on a determined location of the vehicle 200. Further, the signal processing system 502 can utilize the determined location of the vehicle to identify weather data associated with the weather, sun angle data associated with the angle of the sun, light source data associated with one or more light sources, shadow data associated with one or more shadows generated by an object, or any other data associated with the determined location of the vehicle. Based on the identified data, the signal processing system 502 can adjust the signal processing settings used to generate and/or process the sensor data 506 for the vehicle 604.

By adjusting the signal processing settings for the sensor data 506, the signal processing system 502 can improve the ability of the vehicle 604 to accurately identify or detect features or objects within an image, accurately detect locations of objects within an image, and/or accurately predict future trajectories of objects (e.g., determine whether a car has a right turn signal on, which will enable the system to predict that the car is going to make a right turn, which can make the trajectory prediction task easier and/or determine whether a particular object is a pedestrian or an inanimate object, which will enable the system to predict whether the object will move). Further, the signal processing system 502 can provide more useful data to the vehicle 200 and/or a different system (e.g., the signal processing system 502 can provide map annotation data to different signal processing systems and/or a remote system in order to enable the different signal processing systems to adjust settings based on the determined location of a respective vehicle). The signal processing system 502 can, in turn, improve the safety, accuracy, and reliability of the vehicle 200.

In the illustrated example of FIG. 6, the environment 600 includes a tunnel 602. It will be understood that the example environment 600 may include more, less, or different geographic features and/or artificial features. For example, the example environment 600 may include a plurality of light sources, a plurality of trees, and any other features. Further, the vehicle 604 within the example environment 600 may be associated with a particular time of day and/or particular weather. For example, the vehicle 604 may be located in the example environment 600 at noon on a cloudy day. Each of the different features of the example environment 600 may affect the sensor data 506 received by the signal processing system 502. For example, in an example environment 600 with a plurality of trees and/or a plurality of other features that cause shade, the sensor data 506 received by the signal processing system 502 may be significantly different from sensor data 506 received in an example environment 600 without a plurality of trees and/or a plurality of other features that cause shade. Further, in an example environment 600 at night, the sensor data 506 received by the signal processing system 502 may be dramatically different from sensor data 506 received in the example environment 600 during the day. Therefore, the sensor data 506 received by the signal processing system 502 may be based on the example environment 600 of the vehicle 604.

As the vehicle 604 traverses the example environment 600, the sensor data 506 received by the signal processing system 502 of the vehicle 604 may be significantly different based on particular features of the example environment 600. For example, the tunnel 602 may affect the sensor data 506 received by the signal processing system 502 of the vehicle 604.

Prior to entering the tunnel, the signal processing system 502 may receive first sensor data 506. As described herein, the first sensor data 506 can be based on particular signal processing settings of the sensor 504 that generated the sensor data 506. In some cases, the particular signal processing settings can be based on the determined location of the vehicle 604 (e.g., in the example environment 600, the geographic location of the vehicle 604 outside of the tunnel 602), time of day, or other temporal-environmental factors. For example, the signal processing settings may be based on an expected lighting level outside of the tunnel 602 at the particular time (e.g., based on the sun and/or shadows from objects, etc.), the angle of the sun outside of the tunnel 602 (e.g., based on astronomical data associated with the location of the sun at particular times of the day relative to the determined location of the vehicle 200), the weather outside of the tunnel 602 (e.g., based on weather data associated with weather at the determined time and determined location of the vehicle 200), etc. The signal processing settings can also be based on feedback or updates generated by the signal processing system 502 in response to the signal processing system 502 processing sensor data 506 associated with images captured by a sensor.

In some cases, the signal processing system 502 uses a lookup table or annotated map to determine the signal processing settings based on the determined location of the vehicle and the time. For example, the lookup table and/or annotated map can indicate what signal processing settings are to be used for the vehicle when the vehicle is at a particular location. The signal processing settings for the particular location can be generated using on any one or combination of the aforementioned temporal or environmental conditions.

The temporal or environmental conditions used to select the signal processing settings can be different from adjustments or updates made to those settings in response to images being processed by the signal processing system 502. For example, the selection of signal processing settings based on the determined location of the vehicle 600 can be an a priori selection—or a selection made prior to the signal processing system 502 analyzing real time sensor data 506 at that time. The signal processor 508 can then modify the selected signal processing settings based on its processing of received sensor data 506 from the sensor. These adjustments may be viewed as a posteriori adjustments—or adjustments based on analyzing real time sensor data 506 at that time. In this way, the signal processing settings selected based on location may be referred to as baseline (or a priori) signal processing settings and the signal processor 508 can adjust the baseline signal processing settings based on (in response to) the analysis of sensor data 506 received from the sensor (a posteriori).

As the vehicle 604 traverses the example environment 600 (e.g., as the vehicle 604 travels), the signal processing system 502 of the vehicle 604 may determine that the vehicle 604 will enter the tunnel 602 and a predicted time that the vehicle 604 will enter the tunnel 602. In some embodiments, the signal processing system 502 may determine the vehicle 604 is entering the tunnel 602 as the vehicle 604 enters the tunnel 602. Therefore, the signal processing system 502 of the vehicle 604 may determine that the vehicle 604 is entering the tunnel 602. Based on this determination, the signal processing system 502 can select signal processing settings for use based on the location of the vehicle entering the tunnel 602. As the location of the tunnel 602 may be associated with significantly different lighting, clarity, etc. for sensors as compared to locations outside of the tunnel 602, the selected signal processing settings may be significantly different from the signal processing settings used by the vehicle just prior to entering the tunnel or the (recommended) signal processing settings used by the signal processor 508.

As the signal processing system 502 determines the vehicle 604 is entering the tunnel 602 and/or sensor data 506 is associated with a location inside the tunnel 602, the signal processing system 502 can adjust the signal processing settings to utilize the updated signal processing settings. Therefore, the signal processing system 502 can proactively adjust the signal processing settings of the signal processing system 502 based on the geographic location of the vehicle 604. For example, the selected signal processing settings may be significantly different than what the signal processor 508 expects given that the signal processor 508 may have not yet received an image from inside the tunnel 602. As such, signal processing system 502 can change the signal processing settings a priori—prior to receiving an image from the tunnel 602 with the lower lighting.

Further, the adjustment of the signal processing settings by the signal processing system 502 may be tuned to distinct geographic locations. For example, the signal processing system 502 may identify different signal processing settings for different geographic locations of the vehicle 604 outside of the tunnel 602. Further, the signal processing system 502 may determine a first set of signal processing settings for a first geographic location outside of the tunnel 602 and a second set of signal processing settings for a second geographic location outside of the tunnel 602.

The signal processing system 502 may also determine different signal processing settings for the vehicle 604 as the vehicle 604 enters the tunnel. For example, a first location of the vehicle 604 (e.g., the front end of the vehicle 604 has entered the tunnel 602) may be associated with first signal processing settings, a second location of the vehicle 604 (e.g., half of the vehicle 604 has entered the tunnel 602) may be associated with second signal processing settings, a third location of the vehicle 604 (e.g., the vehicle 604 has entered the tunnel 602 and is located at a start of the tunnel 602) may be associated with third signal processing settings, a fourth location of the vehicle 604 (e.g., the vehicle 604 is located in the center of the tunnel 602) may be associated with fourth signal processing settings, etc. Therefore, each geographic location of the vehicle 604 may be associated with a particular set of signal processing settings.

In certain cases, such as when there are sensors in different locations of the vehicle 200, the signal processing system 502 can select different signal processing settings for the different sensors based on the geographic location. For example, if half of the vehicle is in the tunnel 602, the signal processing system 502 may use tunnel-related signal processing settings for the front end of the vehicle and outside-related signal processing settings for the back end of the vehicle.

Moreover, the signal processing system 502 may include multiple signal processing settings for a particular geographic location based on time of day, weather, or other temporal-environmental factors. For example, the signal processing system 502 may use one set of signal processing settings for the location just outside the tunnel 602 in the morning, a second set of signal processing settings in the afternoon, a third set of signal processing settings in the evening, and a fourth set of signal processing settings at night. In certain cases, the signal processing system 502 can include signal processing settings for a particular geographic for each hour, minute, or other time period, etc.

In addition, the signal processing settings for the geographic location can be adjusted based on weather. For example, the signal processing system 502 can determine or estimate how a cloudy or rainy day would affect the lighting at a particular location and adjust the signal processing settings based on the weather. In some cases, this adjustment can be a priori—or before the signal processing system 502 receives images at that location that day.

Utilizing Location Data to Generate an Image

A system (e.g., the signal processing system) can be provided to enable the generation of an image from sensor data 506 based on location data of a vehicle 200. In some embodiments, the sensor data and/or the generation of an image may be based on location data of any other system component (e.g., location data of the signal processing system). For example, the system can identify signal processing settings based on the geographic location. For example, the system can, based on the geographic location, identify lighting data, time of day data, weather data, geographic features data, artificial features data, or any other data associated with the geographic location. Based on the identified data, the system can identify signal processing settings for a particular geographic location.

Figure 7:
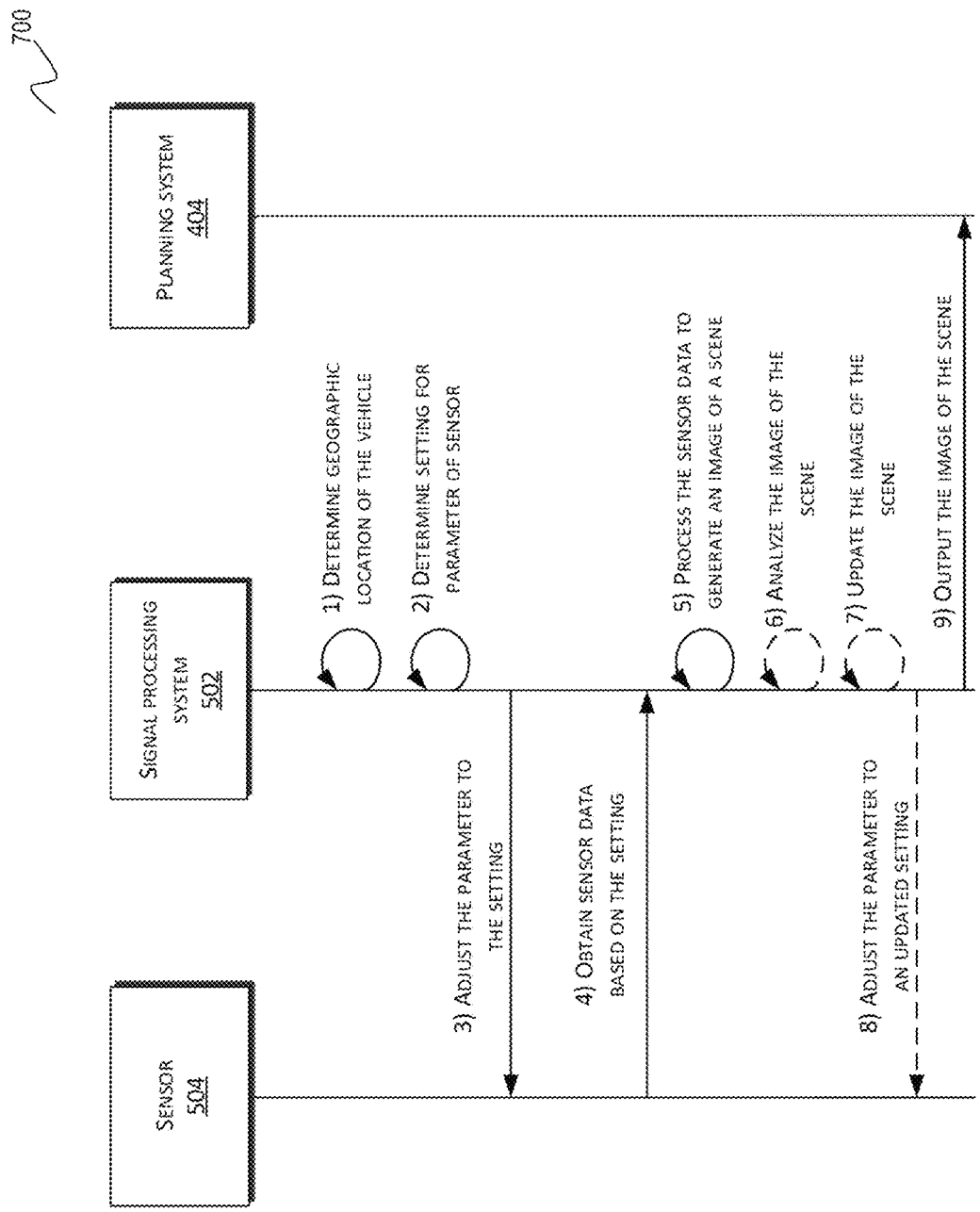
FIG. 7 is a data flow diagram illustrating an example image generation operation.

For example, as described in FIG. 7, the signal processing system may determine the geographic location and may determine signal processing settings that are associated with the geographic location. The signal processing settings may be based on data associated with a particular user and/or data associated with a plurality of users. For example, the signal processing settings may be determined by the system as the vehicle travels (e.g., visits the geographic location). In some embodiments, a different system may identify signal processing settings for particular geographic locations and identify the signal processing settings and geographic locations to the vehicle. For example, the system may parse map data to identify features associated with particular locations (e.g., lighting features such as street lights, bill boards, etc., geological features such as mountains, boulders, etc., natural features such as trees, manmade features such as tunnels, etc.) and may determine signal processing settings based on the identified features.

Further, the system and/or the vehicles may determine signal processing settings based on particular weather and/or a particular time of day at each geographic location. For example, a particular geographic location may have different signal processing settings based on the weather and/or the time of day. As each system and/or vehicle collects the signal processing settings for a particular geographic location (e.g., and for a particular time of day and/or weather), the system and/or vehicle may store the signal processing settings and geographic location. Therefore, based on the geographic location, the time of day at the geographic location, the weather at the geographic location, the vehicle can identify particular signal processing settings for the geographic location at a particular time of day with particular weather.

FIG. 7 is a data flow diagram depicting example illustrative interactions for generating an image of a scene and outputting the image of the scene based on signal processing settings. The signal processing settings may be associated with or linked to the particular geographic location of a vehicle. In the illustrated example, the interactions 700 occur between a sensor 504, a signal processing system 502, and a planning system 404. It will be understood, however, that the interaction can be between different components of the vehicle compute 400 and that the interactions 700 may include more, less, or different interactions. For example, the interactions may include the processing of additional sensor data 506 based on the determined signal processing settings.

At (1), the signal processing system 502 determines a geographic location of the vehicle associated with the signal processing system. The signal processing system 502 can determine a current geographic location of the vehicle and/or a future geographic location of the vehicle. For example, the signal processing system 502 can utilize current location data of the vehicle to identify the current geographic location of the vehicle (e.g., a pair of longitude and latitude coordinates identifying the geographic location of the vehicle and/or determine a location based on other sensor data 506 such as LiDAR data). Further, the signal processing system 502 can utilize route data (e.g., a route of the vehicle) to determine future or predicted geographic locations of the vehicle. For example, the signal processing system 502 may predict a location of the vehicle at a certain point in the future (e.g., ten minutes in the future).

In some cases, signal processing system 502 can determine the geographic location of the vehicle and/or a future geographic location of the vehicle based on a GPS system associated with the vehicle. The signal processing system 502, based on the geographic location of the vehicle, can identify additional information from the GPS. For example, the signal processing system 502 can identify particular features such as tunnels, cities, forests, mountains, etc. and a proximity of the geographic location to these features. The signal processing system 502 can also utilize the geographic location of the vehicle to identify time of day data associated with the geographic location and/or weather data associated with the geographic location. In some embodiments, the signal processing system 502 may determine weather data and/or time of day associated with the signal processing system 502. For example, the signal processing system 502 may determine a local time at the signal processing system 502. In some cases, to identify the weather data and/or time of day data, the signal processing system 502 may provide the geographic location to another system (e.g., a third party service such as a weather service) to determine the predicted weather at the geographic location. Therefore, the signal processing system 502 can determine the geographic location of the vehicle.

At (2), the signal processing system 502 determines a setting (e.g., a signal processing setting) for a parameter of a sensor 504 of the vehicle. Based on the geographic location, the signal processing system may identify lighting conditions and/or color conditions at the geographic location that may affect one or more sensors of the vehicle.

The vehicle may include or be associated with a plurality of sensors to capture sensor data 506 and each sensor may be associated with a plurality of parameters and potential settings for each sensor. In some embodiments, the signal processing system 502 may determine multiple settings for multiple parameters of one or more sensors of the vehicle. For example, the signal processing system 502 may determine a first setting for a first parameter of the sensor 504 and a second setting for a second parameter of the sensor 504.

In some embodiments, the signal processing system 502 may compare information identifying the geographic location of the vehicle with annotated map data that identifies particular geographic locations and settings for each geographic location to determine the settings. Further, the annotated map data may identify different settings for the geographic location based on potential time of day data and potential weather data. Thus, the signal processing system 502 may determine a setting associated with the geographic location, the time of day data, the weather data, and/or any other information associated with the geographic location. Therefore, the signal processing system 502 may identify settings for parameters based on a geographic location of the vehicle with increased accuracy.

In some embodiments, the signal processing system 502 may dynamically determine the setting for the parameter of the sensor 504. For example, the signal processing system 502 may provide the geographic location, the time of day data, and the weather data to a neural network (e.g., a machine learning model). The neural network may be trained on identified, preferred settings for particular geographic locations at particular times and particular weathers. Further, the neural network may determine a suggested setting for the parameter of the sensor based on the geographic location, the time of day data, and the weather data. Based on the provided setting, the signal processing system 502 can anticipate (e.g., predict) a setting for a parameter of the sensor 504 based on the determined geographic location prior to changing lighting conditions (e.g., prior to entering a tunnel). Therefore, the signal processing system 502 can determine a setting for the parameter of the sensor 504 of the vehicle based on the geographic location of the vehicle.

At (3), the signal processing system 502 adjusts the parameter of the sensor 504 to the setting. The signal processing system 502 may adjust the parameter of the sensor 504 from an initial setting (e.g., a setting based on a prior geographic location) to the determined setting. In some embodiments, the signal processing system 502 may adjust the parameter of the sensor 504 from a default setting to the determined setting. Further, based on identifying the geographic location, the signal processing system 502 may adjust the parameter of the sensor to the determined setting to obtain sensor data 506 and readjust the parameter to a default setting based on determining the vehicle has left or is no longer associated with the geographic location. In some embodiments, the signal processing system 502 may not adjust the parameter of the sensor 504 and may use the setting for the parameter to adjust how the signal processing system 502 processes obtained sensor data 506. Therefore, the signal processing system 502 can adjust the parameter of the sensor 504 to the setting.

At (4), the signal processing system 502 obtains the sensor data 506 from the sensor 504 based on the setting. For example, the sensor 504 may capture the sensor data 506 based on the setting and provide the sensor data 506 to the signal processing system 502. The sensor 504 may periodically or aperiodically capture sensor data 506 based on the setting and provide the updated sensor data 506 to the signal processing system 502. In some embodiments, the sensor 504 may provide sensor data 506 based on the setting until the signal processing system 502 further adjusts the parameter. In other embodiments, the sensor 504 may provide sensor data 506 based on the setting for a limited time or for a limited amount of sensor data 506 before defaulting the parameter to a default setting or a previous setting. Therefore, the signal processing system 502 may obtain the sensor data 506 from the sensor 504 based on the setting.

At (5), the signal processing system 502 processes the sensor data 506 to generate the image of the scene. The signal processing system 502 may perform signal processing in order to process the sensor data 506. In some embodiments, the signal processing system 502 may perform signal processing on the sensor data 506 based on the setting. By processing the sensor data 506, the signal processing system 502 may generate an image of the scene based on the setting. Therefore, the signal processing system 502 can process the sensor data 506 to generate the image of the scene.

At (6), the signal processing system 502 analyzes the image of the scene. In order to analyze the image of the scene, the signal processing system 502 may perform a data analysis that includes providing the image of the scene to a neural network trained to identify whether particular objects or features of the image are identifiable. Based on this data analysis, the signal processing system 502 may identify whether the image satisfies particular accuracy or precision constraints. For example, a user of the signal processing system 502 may provide various accuracy or precision thresholds and the signal processing system 502 may, based on analyzing the image of the scene, determine whether the image of the scene satisfies the accuracy or precision thresholds. Therefore, the signal processing system 502 may analyze the image of the scene.

At (7), the signal processing system 502 updates the image of the scene. The signal processing system 502 may determine that the setting for the parameter should be adjusted. For example, the signal processing system 502 may determine that the white balance, gain, tint, exposure, color balance, saturation, etc. should be modified. Further, the signal processing system 502 may identify an updated setting for the parameter on this determination. The signal processing system 502 may update the image of the scene based on the updated settings. Therefore, the signal processing system 502 may update the image of the scene based on analyzing the image of the scene.

At (8), the signal processing system 502 adjusts the parameter of the sensor 504 to an updated setting based on analyzing the image or sensor data 506. As discussed above, the signal processing system 502 may identify an updated setting based on analyzing the image of the scene. The signal processing system 502 may provide the updated setting to the sensor 504 and adjust the parameter of the sensor 504. The sensor 504 may utilize the updated setting to capture additional sensor data 506. In some embodiments, the sensor 504 and/or the signal processing system 502 may store the updated setting with information identifying the geographic location (and time of day data and weather data) for subsequent identification of the updated setting. In this way, the updated setting can be used as an initial or baseline setting in the future for the vehicle or other vehicles at that geographic location.

At (9), the signal processing system 502 outputs the image of the scene to the planning system 404. The signal processing system 502 may output the image of the scene for further data analysis and/or further data processing. For example, the signal processing system 502 may output the image of the scene to identify particular objects or features of the image of the scene. Therefore, the signal processing system 502 may output the image of the scene to the planning system 404.

Adjusting Settings Based on a Geographic Location of the Vehicle

Figure 8:
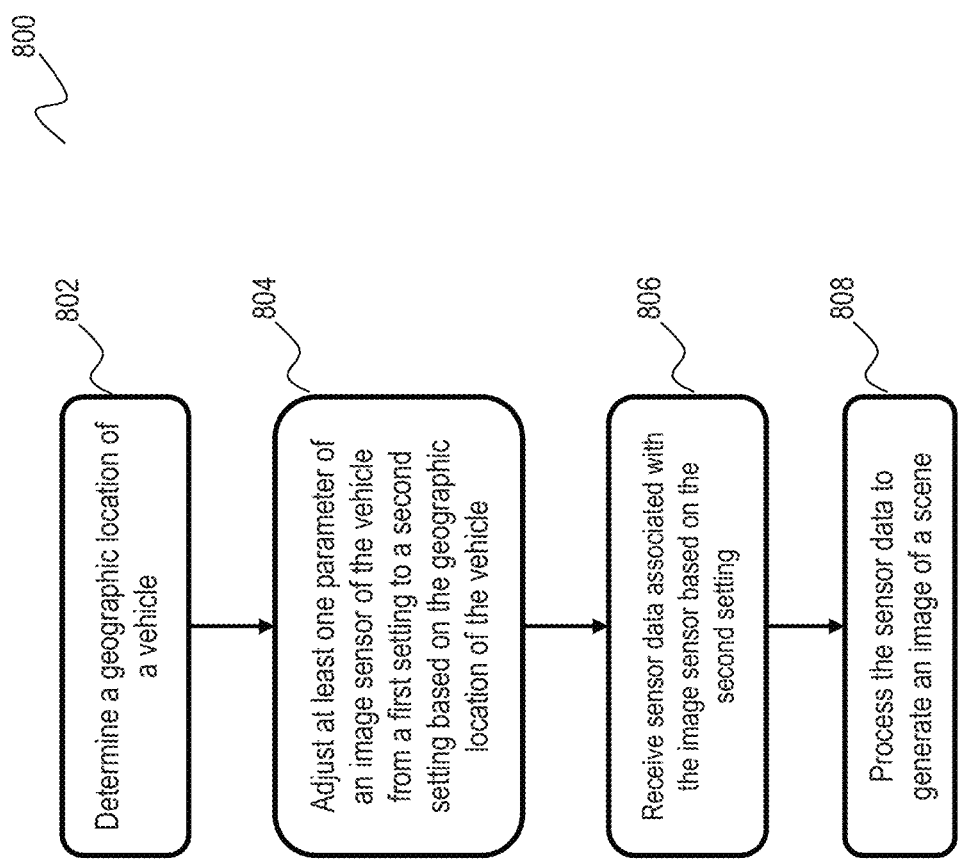
FIG. 8 is a flow diagram illustrating an example of a routine implemented by one or more processors to adjust parameters for an image sensor based on a geographic location.

FIG. 8 is a flow diagram illustrating an example of a routine 800 implemented by one or more processors (e.g., one or more processors of the signal processing system 502). The flow diagram illustrated in FIG. 8 is provided for illustrative purposes only. It will be understood that one or more of the steps of the routine illustrated in FIG. 8 may be removed or that the ordering of the steps may be changed. Furthermore, for the purposes of illustrating a clear example, one or more particular system components are described in the context of performing various operations during each of the data flow stages. However, other system arrangements and distributions of the processing steps across system components may be used.

At block 802, the signal processing system 502 determines a geographic location of the vehicle. To determine the geographic location of the vehicle, the signal processing system 502 may obtain a GPS location of the vehicle. In some cases, the signal processing system 502 can determine the geographic location of the vehicle using sensor data 506, such as LiDAR data, RADAR data, etc. For example, the signal processing system 502 can use the LiDAR data and/or RADAR data to determine a vehicle's location within a map.

In some cases, the signal processing system 502 can determine at least one environmental characteristic of the geographic location of the vehicle. For example, the at least one environmental characteristic may include at least one of time of day data or weather data associated with the particular geographic location. In certain cases, the signal processing system 502 may also determine at least one lighting characteristic of the geographic location of the vehicle. For example, the at least one lighting characteristic may include at least one of a brightness, a location, or a color temperature of a light source at the geographic location.

At block 804, the signal processing system 502 adjusts at least one parameter of an image sensor of the vehicle from a first setting to a second setting based on the geographic location of the vehicle. The signal processing system 502 may adjust the at least one parameter of the image sensor from the first setting to the second setting based on determining that the vehicle is transitioning from an initial geographic location associated with the first setting to the determined geographic location that is associated with the second setting. Further, the first setting may be associated with a first geographic location and the determined geographic location may be a second geographic location. In some embodiments, multiple geographic locations may be associated with the settings. In some cases, geographic locations in close proximity may be associated with significantly different settings (e.g., a geographic location before entering a tunnel and a geographic location after entering the tunnel).

In some embodiments, in order to adjust the at least one parameter of the image sensor from the first setting to the second setting, the signal processing system 502 can identify a map location corresponding to the determined geographic location of the vehicle. The signal processing system 502 can identify at least one annotation associated with the map location. The at least one annotation may correspond to and/or identify the second setting. Therefore, adjusting the at least one parameter of the image sensor from the first setting to the second setting may be based on the at least one annotation. Further, the at least one annotation may include at least one crowd sourced annotation. In some embodiments, the signal processing system may periodically obtain annotation data (e.g., annotation data including the at least one annotation).

In some embodiments, the signal processing system 502 adjusts the at least one parameter of the image sensor based on the geographic location of the vehicle, the at least one environmental characteristic of the geographic location (e.g., the time of day data or the weather data), and/or the lighting characteristic of the geographic location. For example, the signal processing system 502 may adjust any one or any combination of a brightness parameter, a contrast parameter, a white balance parameter, a gain parameter, a tint parameter, an exposure parameter, a saturation parameter, and/or a color balance parameter. In some embodiments, the signal processing system 502 can adjust multiple parameters of the image sensor 504 from a respective first setting to a respective second setting. Further, the signal processing system may adjust parameters of multiple image sensors 504 (e.g., a camera image sensor, a radar sensor, and a LiDAR sensor).

At block 806, the signal processing system 502 receives sensor data 506 associated with the image sensor based on the second setting. The sensor data 506 may include camera data, LiDAR data, and/or radar data. For example, the signal processing system 502 may receive camera data from a camera image sensor, LiDAR data from a LiDAR sensor, and/or radar data from a radar sensor.

At block 808, the signal processing system 502 processes the sensor data 506 to generate an image of the scene. Based on processing the sensor data 506 to generate the image of the scene, the signal processing system 502 may provide the image to a vehicle perception system 402. In some embodiments, the signal processing system 502 may provide the image to a warehouse management computing system, a drone computing system, or a trucking computing system.

In some embodiments, the signal processing system 502 may also process the sensor data 506 based on the geographic location of the vehicle. For example, the signal processing system 502 may, in response to the determined geographic location of the vehicle, adjust a setting that determines how the signal processing system 502 processes the sensor data 506.

It will be understood that the routine 800 can be repeated multiple times using different sensor data 506 and/or different types of sensor data 506. In some cases, the signal processing system 502 may iteratively repeat the routine 800 as the vehicle travels and captures sensor data 506. Further, the signal processing system 502 may repeat the routine 800 for different sensors and/or different parameters of the sensors.

Analyzing Images of a Scene

Figure 9:
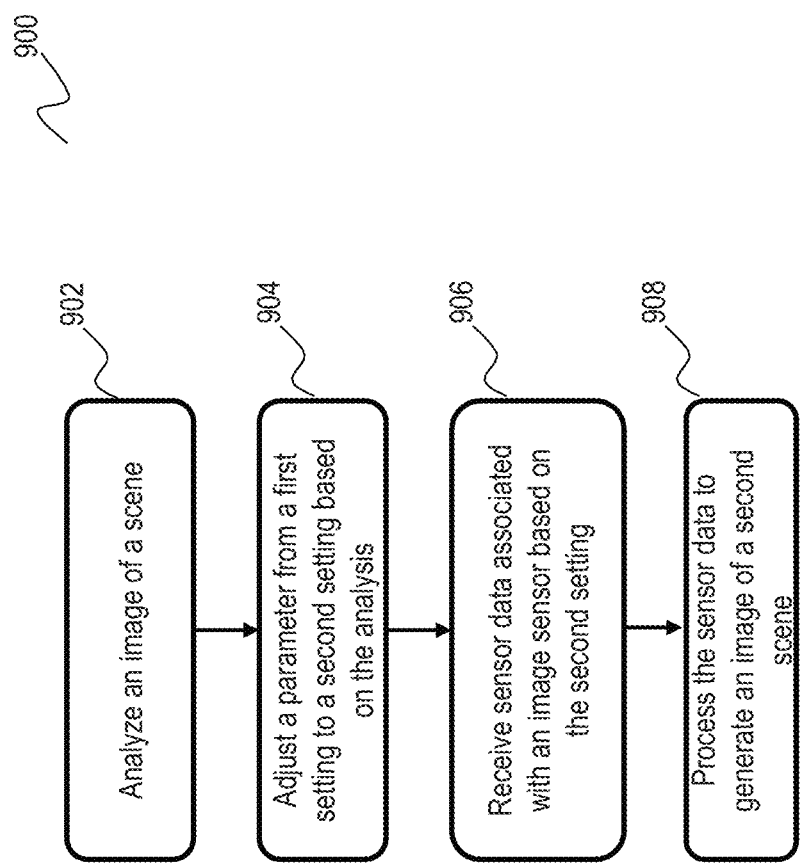
FIG. 9 is a flow diagram illustrating an example of a routine implemented by one or more processors to adjust parameters for an image sensor based on analyzing an image.

FIG. 9 is a flow diagram illustrating an example of a routine 900 implemented by one or more processors (e.g., one or more processors of the signal processing system 502). The flow diagram illustrated in FIG. 9 is provided for illustrative purposes only. It will be understood that one or more of the steps of the routine illustrated in FIG. 9 may be removed or that the ordering of the steps may be changed. Furthermore, for the purposes of illustrating a clear example, one or more particular system components are described in the context of performing various operations during each of the data flow stages. However, other system arrangements and distributions of the processing steps across system components may be used.

At block 902, the signal processing system 502 analyzes an image of a scene. The signal processing system 502 may analyze the image of the scene prior to, simultaneously with, or after outputting the image of the scene. For example, the signal processing system 502 may generate an image of a scene and analyze the image of the scene prior to outputting the image to a machine learning vision system. The signal processing system 502 may utilize any image analysis techniques to analyze the image. For example, the signal processing system 502 can analyze an image of scene generated by the signal processing system based on a geographic location of a vehicle. In some embodiments, in order to analyze the image of the scene, the signal processing system 502 may compare a plurality of images (e.g., a plurality of images including the image) of the scene. In other embodiments, in order to analyze the image of the scene, the signal processing system 502 may compare at least one image quality value of the image of the scene to at least one image quality thresholds.

At block 904, the signal processing system 502 adjusts a parameter (e.g., a parameter of a sensor) from a first setting to a second setting based on the analysis of the image of the scene. In some cases, the first setting can correspond to a setting selected by the signal processing system based on the geographic location of the vehicle, as described herein at least with reference to FIG. 8. Accordingly, after a setting is selected based on the geographic location, the selected settings can be further adjusted based on an analysis of an image captured using the selected setting.

In some cases, the signal processing system 502 can associate the second setting with the geographic location of the vehicle. For example, the signal processing system 502 can determine that the vehicle 200 (or other vehicles) should automatically use the second setting, rather than the first setting, when the vehicle 200 (or other vehicles) are at that geographic location.

As described herein, the signal processing system 502 can associate settings with geographic locations and automatically adjust a sensor's settings to the settings associated with the geographic location of the vehicle. However, after analyzing images at that geographic location, the signal processing system 502 can determine that the settings associated with the geographic location should be adjusted. This can include all settings associated with the geographic location and/or a portions, such as those associated with a particular time of day at the geographic location.

At block 906, the signal processing system 502 receives sensor data 506 associated with an image sensor based on the second setting. In some embodiments, the sensor data 506 used to generate the image of the scene is first sensor data 506 and the sensor data 506 associated with an image sensor based on the second setting is second sensor data 506. Further, the sensor data 506 may represent a second scene.

At block 908, the signal processing system 502 processes the sensor data 506 to generate an image of a second scene. The signal processing system 502 may generate the image of the second scene and provide the image as an output to a planning system 404.

In some embodiments, the signal processing system 502 may also process the sensor data 506 based on the analysis of the image of the scene. For example, the signal processing system 502 may, in response to analyzing the image of the scene, adjust a setting that determines how the signal processing system 502 processes the sensor data 506.

It will be understood that the routine 900 can be repeated multiple times using different sensor data 506 and/or different types of sensor data 506. In some cases, the signal processing system 502 may iteratively repeat the routine 900 as the signal processing system 502 receives sensor data 506 and generates images of scenes based on the sensor data 506. Further, the signal processing system 502 may repeat the routine 900 for different sensors and/or different parameters of the sensors.

In the foregoing description, aspects and embodiments of the present disclosure have been described with reference to numerous specific details that can vary from implementation to implementation. Accordingly, the description and drawings are to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously recited step or entity.

What is claimed is:

1. A method, comprising:
    determining, using at least one processor, a geographic location of a vehicle, wherein at least one parameter of at least one image sensor of the vehicle corresponds to a first setting;
    identifying, using the at least one processor, a map location corresponding to the determined geographic location;
    identifying, using the at least one processor, at least one annotation associated with the map location;
    determining, using the at least one processor, a second setting corresponding to the at least one annotation and associated with the determined geographic location;
    adjusting, using the at least one processor, the at least one parameter from the first setting to the second setting based at least in part on the at least one annotation and determining the geographic location;
    receiving, with the at least one processor, sensor data associated with the at least one image sensor based at least in part on the second setting, the sensor data representing a scene; and processing, with the at least one processor, the sensor data to generate an image of the scene.

2. The method of claim 1, wherein receiving the sensor data associated with the at least one image sensor comprises:
receiving at least one of camera data associated with a camera image sensor, lidar data associated with a lidar sensor, or radar data associated with a radar sensor.

3. The method of claim 1, wherein receiving the sensor data associated with the at least one image sensor comprises:
receiving the sensor data associated with at least one of a camera image sensor, a lidar sensor, or a radar sensor.

4. The method of claim 1, wherein receiving the sensor data associated with the at least one image sensor comprises:
receiving first sensor data associated with the at least one image sensor and representing a first scene, and
wherein processing the sensor data to generate the image comprises:
processing the sensor data to generate a first image, the method further comprising:
analyzing the first image;
adjusting the at least one parameter from the second setting to a third setting based at least in part on analyzing the first image;
receiving second sensor data associated with the at least one image sensor based at least in part on the third setting, the second sensor data representing a second scene; and
processing the second sensor data to generate a second image of the second scene.

5. The method of claim 4, wherein analyzing the first image comprises:
comparing a plurality of images of the scene, the plurality of images comprising the first image.

6. The method of claim 4, wherein analyzing the first image comprises:
comparing an image quality value of the first image to an image quality threshold.

7. The method of claim 4, further comprising:
associating the third setting with the determined geographic location, wherein based on a second determination that the vehicle is at the determined geographic location, the at least one parameter is adjusted to the third setting.

8. The method of claim 1, wherein adjusting the at least one parameter from the first setting to the second setting comprises:
adjusting at least one of brightness, contrast, white balance, gain, tint, exposure, saturation, or color balance.

9. The method of claim 1, further comprising:
determining at least one environmental characteristic of the determined geographic location,
wherein adjusting the at least one parameter from the first setting to the second setting comprises:
adjusting the at least one parameter from the first setting to the second setting further based at least in part on the determined at least one environmental characteristic.

10. The method of claim 9, wherein determining the at least one environmental characteristic comprises:
determining at least one of weather or time of day.

11. The method of claim 1, further comprising:
determining at least one lighting characteristic of the determined geographic location,
wherein adjusting the at least one parameter from the first setting to the second setting comprises:
adjusting the at least one parameter from the first setting to the second setting further based at least in part on the determined at least one lighting characteristic, wherein the at least one lighting characteristic comprises a brightness, a location, or a color temperature of a light source at the determined geographic location.

12. The method of claim 1, wherein adjusting the at least one parameter from the first setting to the second setting comprises:
adjusting the at least one parameter from the first setting to the second setting further based at least in part on determining that the vehicle is transitioning from an initial geographic location associated with the first setting to the determined geographic location.

13. The method of claim 1, wherein identifying the at least one annotation comprises:
identifying at least one crowd sourced annotation.

14. The method of claim 1, further comprising:
periodically obtaining annotation data, the annotation data comprising the at least one annotation.

15. The method of claim 1, wherein determining the geographic location comprises:
determining a first geographic location, wherein the first setting is associated with a second geographic location.

16. The method of claim 1, further comprising:
providing the image to an autonomous vehicle vision and perception system.

17. The method of claim 1, further comprising:
providing the image to a warehouse management computing system, a drone computing system, or a trucking computing system.

18. A system, comprising:
at least one processor, and
at least one non-transitory storage media storing instructions that, when executed by the at least one processor, cause the at least one processor to:
determine a geographic location of a vehicle, wherein at least one parameter of at least one image sensor of the vehicle corresponds to a first setting;
identify a map location corresponding to the determined geographic location;
identify at least one annotation associated with the map location;
determine a second setting corresponding to the at least one annotation and associated with the determined geographic location;
adjust the at least one parameter from the first setting to the second setting based at least in part on the at least one annotation and determining the geographic location;
receive sensor data associated with the at least one image sensor based at least in part on the second setting, the sensor data representing a scene; and
process the sensor data to generate an image of the scene.

19. At least one non-transitory storage media storing instructions that, when executed by a computing system comprising a processor, cause the computing system to:
determine a geographic location of a vehicle, wherein at least one parameter of at least one image sensor of the vehicle corresponds to a first setting;
identify a map location corresponding to the determined geographic location;
identify at least one annotation associated with the map location;
determine a second setting corresponding to the at least one annotation and associated with the determined geographic location;

adjust the at least one parameter from the first setting to the second setting based at least in part on the at least one annotation and determining the geographic location;
receive sensor data associated with the at least one image sensor based at least in part on the second setting, the sensor data representing a scene; and
process the sensor data to generate an image of the scene.

\* \* \* \* \*